United States Patent
Uegami et al.

(10) Patent No.: US 7,482,384 B2
(45) Date of Patent: *Jan. 27, 2009

(54) IRON COMPOSITE PARTICLES FOR PURIFYING SOIL OR GROUND WATER, PROCESS FOR PRODUCING THE SAME, PURIFYING AGENT CONTAINING THE SAME, PROCESS FOR PRODUCING THE PURIFYING AGENT AND METHOD FOR PURIFYING SOIL OR GROUND WATER

(75) Inventors: Masayuki Uegami, Ube (JP); Junichi Kawano, Onoda (JP); Koji Kakuya, Ube (JP); Tomoko Okita, Hatsukaichi (JP); Kenji Okinaka, Ube (JP)

(73) Assignee: Toda Kogyo Corporation, Hiroshima-Ken (JP)

( * ) Notice: Subject to any disclaimer, the term of this patent is extended or adjusted under 35 U.S.C. 154(b) by 343 days.

This patent is subject to a terminal disclaimer.

(21) Appl. No.: 10/862,899

(22) Filed: Jun. 8, 2004

(65) Prior Publication Data
US 2006/0151398 A1    Jul. 13, 2006

(30) Foreign Application Priority Data
Jun. 10, 2003  (JP) .............................. 2003-165812

(51) Int. Cl.
*A62D 3/34* (2007.01)
*B01F 3/12* (2006.01)
*C02F 1/72* (2006.01)

(52) U.S. Cl. ........................ 516/95; 252/178; 510/370; 510/418; 516/88

(58) Field of Classification Search .................... 516/95, 516/88; 510/370, 418
See application file for complete search history.

(56) References Cited

U.S. PATENT DOCUMENTS

| | | | |
|---|---|---|---|
| 3,320,049 A | 5/1967 | Hendrickson | |
| 6,271,168 B1 | 8/2001 | Imai et al. | |
| 6,276,287 B1 | 8/2001 | Imai et al. | |
| 6,459,012 B1 | 10/2002 | Imai et al. | |
| 6,596,190 B1 | 7/2003 | Igawa et al. | |
| 6,663,840 B2 | 12/2003 | Imai et al. | |
| 6,800,587 B2 | 10/2004 | Imai et al. | |
| 6,827,757 B2 * | 12/2004 | Ozaki et al. | ................... 75/252 |
| 7,022,256 B2 | 4/2006 | Uegami et al. | |
| 2002/0059818 A1 | 5/2002 | Imai et al. | |
| 2003/0039857 A1 | 2/2003 | Zhang et al. | |
| 2003/0116745 A1 | 6/2003 | Ozaki et al. | |
| 2003/0217974 A1 | 11/2003 | Uegami et al. | |
| 2004/0115479 A1 * | 6/2004 | James et al. | ............. 428/694 B |
| 2004/0226404 A1 | 11/2004 | Ozaki et al. | |
| 2006/0070958 A1 | 4/2006 | Kakuya et al. | |
| 2006/0081811 A1 | 4/2006 | Matsui et al. | |
| 2006/0113255 A1 | 6/2006 | Kakuya et al. | |
| 2006/0163172 A1 | 7/2006 | Uegami et al. | |

FOREIGN PATENT DOCUMENTS

| | | |
|---|---|---|
| EP | 1 151 807 A1 | 11/2001 |
| EP | 1 190 738 A | 3/2002 |
| EP | 1 318 103 A | 6/2003 |
| JP | 2002 317202 A | 10/2002 |

OTHER PUBLICATIONS

U.S. Appl. No. 10/998,194, filed Nov. 29, 2004.
U.S. Appl. No. 11/072,638, filed Mar. 7, 2005.
U.S. Appl. No. 11/236,871, filed Sep. 28, 2005.
U.S. Appl. No. 11/324,369, filed Mar. 7, 2006.

* cited by examiner

*Primary Examiner*—Timothy J Kugel
(74) *Attorney, Agent, or Firm*—Nixon & Vanderhye P.C.

(57) ABSTRACT

Iron composite particles for purifying soil or ground water, comprise α-Fe and magnetite, and having a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.30 to 0.95 as measured from X-ray diffraction spectrum of the iron composite particles, an Al content of 0.10 to 1.50% by weight and an S content of 3500 to 7000 ppm; a process for producing the iron composite particles; a purifying agent containing the iron composite particles; a process for producing the purifying agent; and a method for purifying soil or ground water.

12 Claims, 7 Drawing Sheets

◆ : COMPARATIVE EXAMPLE 3
■ : COMPARATIVE EXAMPLE 4
▲ : COMPARATIVE EXAMPLE 5
✕ : COMPARATIVE EXAMPLE 6
□ : COMPARATIVE EXAMPLE 7
● : EXAMPLE 1

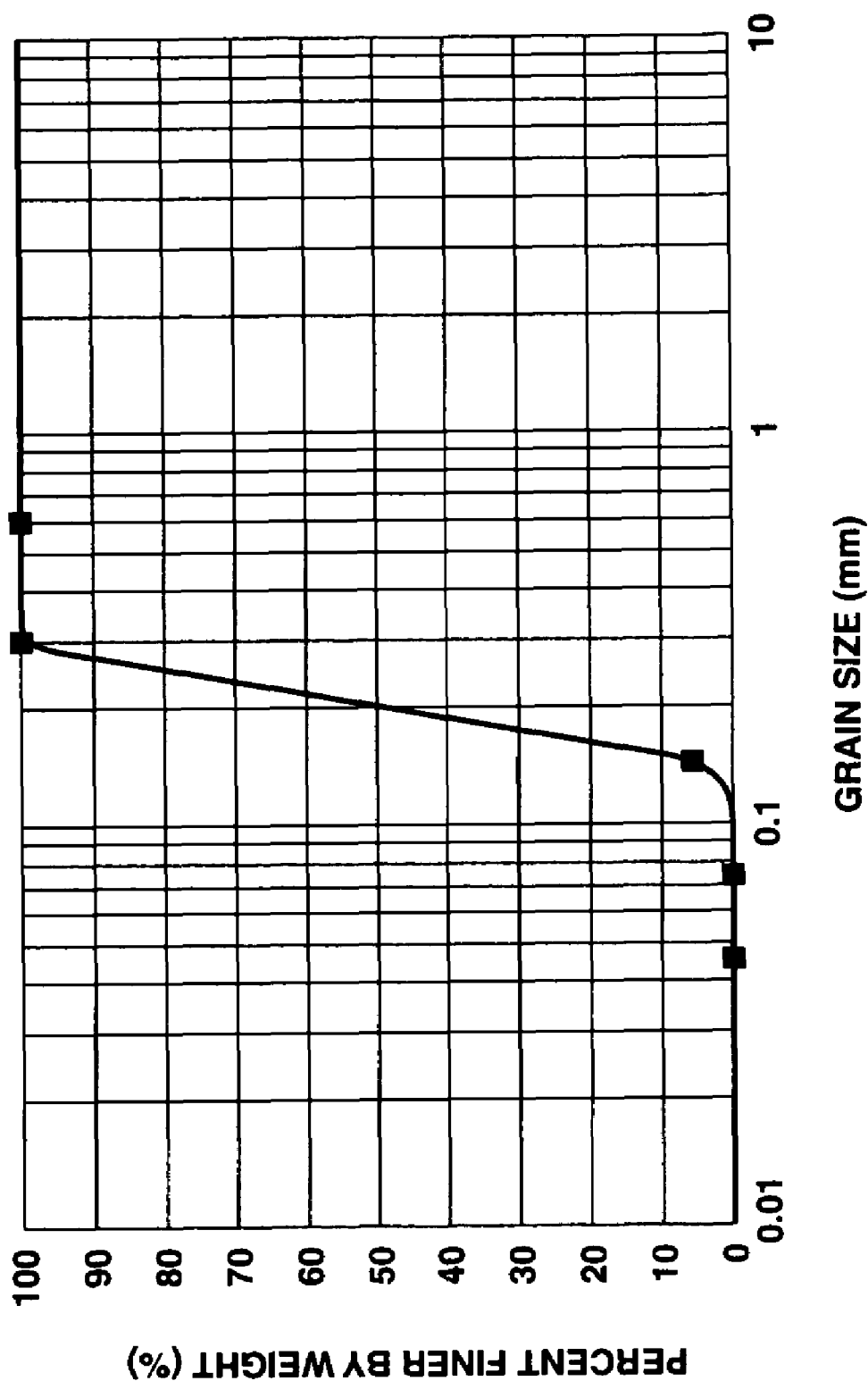

IRON COMPOSITE PARTICLES FOR PURIFYING SOIL OR GROUND WATER, PROCESS FOR PRODUCING THE SAME, PURIFYING AGENT CONTAINING THE SAME, PROCESS FOR PRODUCING THE PURIFYING AGENT AND METHOD FOR PURIFYING SOIL OR GROUND WATER

BACKGROUND OF THE INVENTION

The present invention relates to iron composite particles for purifying soil or ground water, a process for producing the iron composite particles, a purifying agent containing the iron composite particles, a process for producing the purifying agent, and a method for purifying soil or ground water. More particularly, the present invention relates to iron composite particles for decomposing and insolubilizing (1) organohalogen compounds, for example, aliphatic organohalogen compounds such as dichloromethane, carbon tetrachloride, 1,2-dichloroethane, 1,1-dichloroethane, cis-1,2-dichloroethylene, 1,1,1-trichloroethane, 1,1,2-trichloroethane, trichloroethylene, tetrachloroethylene, 1,3-dichloropropene or the like, aromatic organohalogen compounds such as dioxins, PCB or the like, (2) heavy metals such as cadmium, lead, chromium, arsenic, selenium, cyanogens or the like, which are contained in soil or ground water, in an efficient, continuous and economical manner; a process for producing the iron composite particle; a purifying agent containing the iron composite particles; a process for producing the purifying agent; and a method for purifying soil or ground water using the purifying agent.

The above aliphatic organohalogen compounds such as trichloroethylene, tetrachloroethylene or the like have been extensively used for cleaning in semiconductor-manufacturing factories and for degreasing metals to be machined.

Also, waste gases, fly ashes or main ashes discharged from incineration furnaces for combusting municipal garbage or industrial wastes, contain aromatic organohalogen compounds such as dioxins having an extremely high toxicity to human bodies even in a trace amount. The "dioxins" are a generic name of such compounds formed by replacing hydrogen atoms of dibenzo-p-dioxine, dibenzofuran, etc., with chlorine atoms. The waste gases or fly ashes continuously stay around the incineration furnace, so that the dioxins still remain in soil of surrounding regions.

Further, PCB (polychlorinated biphenyl) has been used in many application as insulating oils for transformers and capacitors, plasticizers or heating medium because of high chemical and thermal stability and excellent electrical insulating property thereof. Since the PCB is very harmful, the production and use thereof has been presently prohibited. However, any effective PCB-treating method has not been established until now and, therefore, a large part of the PCB past used has still been stored without treatment or disposal.

The organohalogen compounds such as aliphatic organohalogen compounds, aromatic organohalogen compounds or the like are hardly decomposable and besides exhibit carcinogenesis as well as a strong toxicity. Therefore, there arises such a significant environmental problem that soil or ground water is contaminated with these organohalogen compounds. More specifically, upon discharge of the above organohalogen compounds, the hardly-decomposable organohalogen compounds are accumulated in soil, and the soil contaminated with the organohalogen compounds further causes contamination of ground water by the organohalogen compounds. In addition, the contaminated ground water flows out from the contaminated soil and spreads over the surrounding regions, so that the problem of pollution by the organohalogen compounds is caused over wider areas.

The soil is once contaminated with the organohalogen compounds, land involving the soil cannot be reused and developed again. Therefore, there have been proposed various techniques or methods of purifying the soil and ground water contaminated with the organohalogen compounds. However, since the organohalogen compounds are hardly decomposable and a large amount of soil and ground water must be purified, any efficient and economical purifying techniques or methods have not been fully established until now.

As the method of purifying soil contaminated with the organohalogen compounds, there are known a purifying method of using various catalysts; a method of absorbing and removing vapors of the organohalogen compounds by utilizing a volatility thereof; a thermal decomposition method of heat-treating excavated soil to convert the soil into harmless one; a method of purifying the soil by microorganisms; or the like. In addition, as to the ground water contaminated with the organohalogen compounds, there are known a method of extracting the contaminated ground water out of soil and converting the ground water into harmless one; a method of pumping the contaminated ground water and removing the organohalogen compounds therefrom; or the like.

Among these conventional methods of purifying soil or ground water contaminated with the organohalogen compounds, there have been proposed many methods of purifying the soil or ground water contaminated with the organohalogen compounds into harmless ones by mixing and contacting the soil or ground water with a purifying agent composed of iron-based particles (Japanese Patent Application Laid-Open (KOKAI) Nos. 11-235577(1999), 2000-5740, 2000-334063, 2001-38341, 2001-198567, 2002-161263, 2002-210452 and 2002-317202).

On the other hand, with recent increasing consciousness of environmental protection, the contamination of soil or ground water by heavy metals or the like has been noticed. In particular, soil or ground water contaminated by harmful substances including heavy metals such as cadmium, lead, chromium, arsenic, selenium, cyanogen or the like exerts significant influences on human bodies and ecosystem. Therefore, the development of methods for purification and removal of these harmful substances has also been urgently demanded.

As well known in the art, technical measures for treatment of soil or ground water contaminated with harmful substances such as heavy metals are classified into two categories, i.e., "purification techniques" and "containment". Further, the purification techniques are classified into "in-situ purification" and "removal by excavation" in which contaminated soil is excavated and removed from objective lands. Furthermore, the "in-situ purification" techniques are classified into "in-situ decomposition" in which heavy metals or the like contained in the contaminated soil or ground water, are decomposed under the ground (in situ), and "in-situ extraction" in which the contaminated soil or ground water is extracted or excavated, and then heavy metals or the like contained in the soil or ground water are removed therefrom.

Further, the "in-situ extraction" techniques are classified into "decomposition" in which among objective substances belonging to the "heavy metals or the like", compounds such as cyanogen and agricultural chemicals are thermochemically decomposed, and "separation" in which concentrated heavy metals, etc., are physically separated from the contaminated soil or ground water.

On the other hand, the "containment" techniques are classified into "in-situ containment" and "containment after removal by excavation". The in-situ containment techniques are techniques of solidifying contaminated soil by mixing a solidifying agent therewith, and then confining the contaminated soil in situ without displacement therefrom. The techniques of containment after removal by excavation are techniques of pre-mixing an insolubilizing agent with contaminated soil to convert the soil into hardly-soluble one, drilling the contaminated soil once, and then confining the contaminated soil in place.

As the working methods for executing the "purification techniques", there may be used a soil-washing method, a heat-desorption method or the like. For example, there may be used a chemical dissolution method in which chemicals are added to the contaminated soil to dissolve heavy metals or the like therein, and then the resultant solution is separated therefrom; a water-washing method of washing the contaminated soil with water and then classifying the soil to separate fine particles containing a large amount of heavy metals or the like therefrom; a soil wet-washing method of washing out contaminants adhered onto the surface of soil particles with a washing agent, and further classifying the soil particles into clean large particles and fine contaminant particles according to particle size and specific gravity thereof; or the like.

Also, in the "containment" techniques, as the working method for the "in-situ containment", there is known a method of mixing a solidifying agent such as cement with the contaminated soil and then confining the solidified soil by a water-impermeable layer, steel sheet pile, etc. As the working method for the "containment after removal by excavation", there is known a method of adding chemicals to the contaminated soil to insolubilize the soil and change the soil into hardly-elutable form, and then confining the hardly-elutable soil by insulating method or water-shielding method.

However, the above conventional treatment techniques undergo high treating costs, and require a prolonged treating time. Therefore, these techniques may fail to reduce harmful substances such as heavy metals or the like in an efficient and continuous manner.

In recent years, there have been developed low-cost treating techniques of reducing a valence of the heavy metals mainly on the basis of a reducing activity of iron particles in order to convert the heavy metals into harmless and stabilized form. For example, in Japanese Patent Application Laid-Open (KOKAI) No. 2001-198567, there is described the method of utilizing a reducing activity of iron particles to chromium (reduction in metal valence). In addition, in Japanese Patent Publication (KOKOKU) No. 52-45665(1977), it is described that when iron particles are added to a heavy metal ion-containing solution whose pH value is adjusted to about 5 to 6, and then the resultant mixture is stirred, a part of the iron particles are dissolved and precipitated in the form of ferric hydroxide which is then transformed into goethite or lepidocrocite with increase of the pH value, whereupon a part of the heavy metals are co-precipitated together with the goethite or lepidocrocite, so that a large part of the heavy metals are adsorbed into the resultant iron particles. Also, it is described that the amount of the iron particles eluted is increased at a low pH value, resulting in deteriorated adsorption/removal effect thereof.

In Japanese Patent Application Laid-Open (KOKAI) No. 11-235577(1999), there is described a method of adding and mixing in soil, iron particles containing carbon in an amount of not less than 0.1% by weight to convert organohalogen compounds contained in the soil into harmless ones. In this method, although the specific surface area and particle size of the iron particles used are specified, since the particle size is too large, it may be difficult to fully decompose the organohalogen compounds.

In Japanese Patent Application Laid-Open (KOKAI) No. 2000-5740, there is described the method of converting organohalogen compounds contained in soil into harmless ones using copper-containing iron particles. However, since decomposition of the organohalogen compounds requires a long period of time, this method may also fail to efficiently convert the organohalogen compounds into harmless ones.

In Japanese Patent Application Laid-Open (KOKAI) No. 2000-334063, there is described the method of contacting dioxins with an aqueous hydrochloric acid solution containing mill scale produced from the production process of hot-rolled steel plate in ironworks, at a temperature lower than 100° C. to convert the dioxins into harmless ones. However, since the use of the aqueous hydrochloric acid solution is essentially required in order to promote conversion of the organohalogen compounds into harmless ones, the decomposition reaction of the mill scale-by itself may fail to proceed sufficiently.

In Japanese Patent Application Laid-Open (KOKAI) No. 2001-38341, there is described a soil-purifying agent composed of a water suspension containing iron particles having an average particle diameter of 1 to 500 μm. However, since the iron particles used have a too large particle size, it may be difficult to fully decompose the organohalogen compounds.

In Japanese Patent Application Laid-Open (KOKAI) No. 2001-198567, there is described the method of using a water suspension containing spherical iron particles having an average particle diameter of less than 10 μm. Since the water suspension containing the spherical iron particles is obtained by collecting dusts contained in waste gas discharged during refining process from an oxygen blowing converter for steel-making, and removing gases from the dusts, it may be difficult to fully reduce the organohalogen compounds.

Further, the above method described in Japanese Patent Application Laid-Open (KOKAI) No. 2001-198567 is the method of converting the harmful substances into harmless and stabilized ones by utilizing the reducing activity of the iron particles (reduction in valence). However, the iron particles suffer from deterioration in the reducing activity with the elapse of years, thereby failing to continuously maintain the reducing activity. As a result, even though the heavy metals are temporarily converted into those having a stable and harmless low valence, there is a possibility that the valence is thereof increased again, so that the heavy metals are converted into previous harmless ones. Therefore, the above method fails to provide a long-term effective purification method.

In Japanese Patent Application Laid-Open (KOKAI) No. 2002-161263, there are described iron particles for decomposing organohalogen compounds in which a part of the surface of the iron particles is adhered with a metal selected from nickel, copper, cobalt and molybdenum, and the remaining part of the surface other than the surface adhered with the above metal is covered with an iron oxide film. However, the iron particles used are iron particles obtained from mill scale or iron particles obtained by atomizing molten steel with water. As is apparent from the specific surface area of the iron particles as described therein, it is considered that the iron particles have a large particle size. Thus, the iron particles may also fail to fully reduce the organohalogen compounds.

In Japanese Patent Application Laid-Open (KOKAI) No. 2002-210452, it is described to use sulfur-containing iron particles for purification treatment of soil or ground water contaminated with organohalogen compounds. However, since the iron particles have a too large particle size, it may be difficult to fully reduce the organohalogen compounds.

Also, in Japanese Patent Application Laid-Open (KOKAI) No. 2002-317202, it is described to use magnetite-containing iron composite particles for purification treatment of soil or ground water contaminated with organohalogen compounds. However, since the iron particles contain no sulfur, it may be difficult to fully reduce the organohalogen compounds.

In addition, the method described in Japanese Patent Publication (KOKOKU) No. 52-45665(1977) utilizes mainly the reducing activity or absorption activity of the iron particles. Although these activities are attained by a partial dissolution of the iron particles, the method is based on such a mechanism that when the iron particles are eluted over a whole acidic range and then converted into goethite, lepidocrocite or magnetite, the heavy metals are included therein. Therefore, this method is not a method of positively using such a phenomenon that the iron particles are dissolved in the form of $Fe^{2+}$ or $Fe^{3+}$ and formed into spinel ferrite while incorporating heavy metals therein.

As a result of the present inventors' earnest studies for solving the above problems, it has been found that resultant iron composite particles obtained by cooling iron particles obtained by heat-reducing goethite or hematite particles having a specific average particle diameter and a specific Al content at a temperature of 350 to 600° C.; transferring the obtained iron particles into water without forming a surface oxidation film on surface of the iron particles in a gas phase; forming the surface oxidation film on the surface of the iron particles in water; and then drying the iron particles provided with the surface oxidation film, are capable of treating organohalogen compounds and/or heavy metals contained in the soil or ground water in an efficient, continuous and economical manner. The present invention has been attained on the basis of this finding.

SUMMARY OF THE INVENTION

An object of the present invention is to provide iron composite particles for purifying soil or ground water, which are capable of treating organohalogen compounds and/or heavy metals contained therein in an efficient, continuous and economical manner, as well as a process for producing the iron composite particles.

Another object of the present invention is to provide a purifying agent for soil or ground water, which are capable of treating organohalogen compounds and/or heavy metals contained therein in an efficient, continuous and economical manner, as well as a process for producing the purifying agent.

A further object of the present invention is to provide a method for purifying soil or ground water by treating organohalogen compounds and/or heavy metals contained therein.

To accomplish the aims, in a first aspect of the present invention, there is provided iron composite particles for purifying soil or ground water, comprising α-Fe and magnetite, and having a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.30 to 0.95 as measured from X-ray diffraction spectrum of the iron composite particles, an Al content of 0.10 to 1.50% by weight and an S content of 3500 to 7000 ppm.

In a second aspect of the present invention, there is provided iron composite particles for purifying soil or ground water, comprising α-Fe and magnetite, and having a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.30 to 0.95 as measured from X-ray diffraction spectrum of the iron composite particles, an Al content of 0.10 to 1.50% by weight, an S content of 3500 to 7000 ppm, a saturation magnetization value of 85 to 155 Am$^2$/kg, a BET specific surface area of 5 to 60 m$^2$/g, a crystallite size of (110) plane of α-Fe of 200 to 400 Å, and an average particle diameter of 0.05 to 0.50 μm.

In a third aspect of the present invention, there is provided iron composite particles for purifying soil or ground water, comprising α-Fe and magnetite, and having a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.32 to 0.95 as measured from X-ray diffraction spectrum of the iron composite particles, an Al content of 0.20 to 1.20% by weight, an S content of 3800 to 7000 ppm, a saturation magnetization value of 90 to 155 Am$^2$/kg, a BET specific surface area of 7 to 55 m$^2$/g, a crystallite size of (110) plane of α-Fe of 200 to 350 Å, and an average particle diameter of 0.05 to 0.30 μm.

In a fourth aspect of the present invention, there is provided a process for producing iron composite particles for purifying soil or ground water, comprising:

heat-reducing goethite particles having an average major axis diameter of 0.05 to 0.50 μm, an Al content of 0.06 to 1.00% by weight and an S content of 2200 to 4500 ppm or hematite particles having an average major axis diameter of 0.05 to 0.50 μm, an Al content of 0.07 to 1.13% by weight and an S content of 2400 to 5000 ppm, at a temperature of 350 to 600° C. to produce iron particles;

after cooling, transferring the iron particles into water without forming a surface oxidation film on surface of the iron particles in a gas phase;

forming the surface oxidation film on the surface of the iron particles in water; and then drying the iron particles having the surface oxidation film thereon.

In a fifth aspect of the present invention, there is provided a purifying agent for soil or ground water, comprising a water suspension containing as an effective ingredient, iron composite particles which comprise α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.20 to 0.95 as measured from X-ray diffraction spectrum of the iron composite particles, an Al content of 0.10 to 1.50% by weight, an S content of 3500 to 7000 ppm, an average particle diameter of 0.05 to 0.5 μm and a particle diameter of coarse particles of usually 0.5 to 5.0 μm.

In a sixth aspect of the present invention, there is provided a purifying agent for soil or ground water, comprising a water suspension containing as an effective ingredient, iron composite particles which comprise α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.20 to 0.95 as measured from X-ray diffraction spectrum of the iron composite particles, an Al content of 0.10 to 1.50% by weight, an S content of 3500 to 7000 ppm, an average particle diameter of 0.05 to 0.5 μm and a particle diameter of coarse particles of usually 0.5 to 5.0 μm, a saturation magnetization value of 70 to 155 Am$^2$/kg, a crystallite size of (110) plane of α-Fe of 200 to 400 Å, and an Fe content of usually not less than 65% by weight based on the weight of whole particles.

In a seventh aspect of the present invention, there is provided a purifying agent for soil or ground water, comprising a water suspension containing as an effective ingredient, iron composite particles which have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.30 to 0.95 as measured from X-ray diffraction spectrum of the iron composite particles, an Al content of 0.10 to 1.50% by weight, an S content of 3500 to 7000 ppm, an average particle diameter of 0.05 to 0.50 μm, a particle diameter of coarse particles of usually 0.5 to 3.0 μm, a saturation magnetization value of 85 to 155 Am²/kg, a crystallite size of (110) plane of α-Fe of 200 to 400 Å, and an Fe content of usually not less than 75% by weight based on the weight of whole particles.

In an eighth aspect of the present invention, there is provided a purifying agent for soil or ground water, comprising a water suspension containing as an effective ingredient, iron composite particles having a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.20 to 0.95 as measured from X-ray diffraction spectrum of the iron composite particles, an Al content of 0.10 to 1.50% by weight, an S content of 3500 to 7000 ppm, an average particle diameter of 0.1 to 0.50 μm, a particle diameter of coarse particles of usually 0.5 to 4.0 μm, a saturation magnetization value of 70 to 140 Am²/kg, a crystallite size of (110) plane of α-Fe of 200 to 400 Å, and an Fe content of usually not less than 65% by weight based on the weight of whole particles.

In a ninth aspect of the present invention, there is provided a purifying agent for soil or ground water, comprising a water suspension containing iron composite particles as an effective ingredient and sodium polyacrylate, said iron composite particles comprising α-Fe and magnetite, and having a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.20 to 0.95 as measured from X-ray diffraction spectrum of the iron composite particles, an Al content of 0.10 to 1.50% by weight, an S content of 3500 to 7000 ppm and an average particle diameter of 0.05 to 0.50 μm, and a particle diameter of coarse particles of usually 0.5 to 5.0 μm.

In a tenth aspect of the present invention, there is provided a purifying agent for soil or ground water, comprising a water suspension containing iron composite particles as an effective ingredient and sodium polyacrylate, said iron composite particles comprising α-Fe and magnetite, and having a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.20 to 0.95 as measured from X-ray diffraction spectrum of the iron composite particles, an Al content of 0.10 to 1.50% by weight, an S content of 3500 to 7000 ppm and an average particle diameter of 0.05 to 0.50 μm, and a particle diameter of coarse particles of usually 0.5 to 5.0 μm, a saturation magnetization value of 70 to 155 Am²/kg, a crystallite size of (110) plane of α-Fe of 200 to 400 Å, and an Fe content of usually not less than 65% by weight based on the weight of whole particles.

In an eleventh aspect of the present invention, there is provided a purifying agent for soil or ground water, comprising a water suspension containing iron composite particles as an effective ingredient and sodium polyacrylate, said iron composite particles comprising α-Fe and magnetite, and having a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.30 to 0.95 as measured from X-ray diffraction spectrum of the iron composite particles, an Al content of 0.10 to 1.50% by weight, an S content of 3500 to 7000 ppm, an average particle diameter of 0.05 to 0.50 μm, a particle diameter of coarse particles of usually 0.5 to 3.0 μm, a saturation magnetization value of 85 to 155 Am²/kg, a crystallite size of (110) plane of α-Fe of 200 to 400 Å, and an Fe content of usually not less than 75% by weight based on the weight of whole particles.

In a twelfth aspect of the present invention, there is provided a purifying agent for soil or ground water, comprising a water suspension containing iron composite particles as an effective ingredient and sodium polyacrylate, said iron composite particles comprising α-Fe and magnetite and having a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.20 to 0.95 as measured from X-ray diffraction spectrum of the iron composite particles, an Al content of 0.10 to 1.50% by weight, an S content of 3500 to 7000 ppm, an average particle diameter of 0.1 to 0.30 μm, a particle diameter of coarse particles of 0.50 to 3.0 μm, a saturation magnetization value of 70 to 140 Am²/kg, a crystallite size of (110) plane of α-Fe of 200 to 400 Å and an Fe content of usually not less than 65% by weight based on the weight of whole particles.

In a thirteenth aspect of the present invention, there is provided a purifying agent for soil or ground water, comprising a water suspension containing iron composite particles as an effective ingredient which comprise α-Fe and magnetite and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.20 to 0.95 as measured from X-ray diffraction spectrum of the iron composite particles, an Al content of 0.10 to 1.50% by weight, an S content of 3500 to 7000 ppm, an average particle diameter of 0.05 to 0.50 μm and, a particle diameter of coarse particles of usually 0.50 to 5.0 μm, said iron composite particles in the water suspension being diluted to a concentration of 0.1 to 200 g/L.

In a fourteenth aspect of the present invention, there is provided a purifying agent for soil or ground water, comprising a water suspension containing iron composite particles as an effective ingredient, and sodium hydrogen carbonate, sodium sulfate or a mixture thereof, said iron composite particles comprising α-Fe and magnetite and having a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.20 to 0.95 as measured from X-ray diffraction spectrum of the iron composite particles, an Al content of 0.10 to 1.50% by weight, an S content of 3500 to 7000 ppm and an average particle diameter of 0.05 to 0.5 μm, a particle diameter of coarse particles of usually 0.50 to 5.0 μm, a saturation magnetization value of 70 to 155 Am²/kg, a crystallite size of (110) plane of α-Fe of 200 to 400 Å, and an Fe content of usually not less than 65% by weight based on the weight of whole particles, said iron composite particles in the water suspension being diluted to a concentration of 0.1 to 200 g/L.

In a fifteenth aspect of the present invention, there is provided a process for producing a purifying agent for soil or ground water, comprising:

preparing a water suspension containing iron composite particles which are produced by the steps of:

heat-reducing goethite particles having an average major axis diameter of 0.05 to 0.50 μm, an Al content of 0.06 to 1.00% by weight and an S content of 2200 to 4500 ppm or hematite particles having an average major axis diameter of 0.05 to 0.50 μm, an Al content of 0.07 to 1.13% by weight and an S content of 2400 to 5000 ppm, at a temperature of 350 to 600° C. to produce iron particles;

after cooling, transferring the iron particles into water without forming a surface oxidation film on surface of the iron particles in a gas phase;

forming the surface oxidation film on the surface of the iron particles in water.

In a sixteenth aspect of the present invention, there is provided a method for purifying soil or ground water, comprising:

mixing and contacting (1) iron composite particles or (2) a water suspension containing the iron composite particles as an effective ingredient, with soil contaminated with organohalogen compounds and/or heavy metals or the like, or ground water contaminated with organohalogen compounds and/or heavy metals or the like, the iron composite particles comprising α-Fe and magnetite, and having a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.30 to 0.95 as measured from X-ray diffraction spectrum of the iron composite particles, an Al content of 0.10 to 1.50% by weight, and an S content of 3500 to 7000 ppm.

BRIEF DESCRIPTION OF THE DRAWINGS

FIG. 7 is a graph showing a particle size distribution of a glass column having a diameter of 3 cm and a length of 50 cm, used in "Penetrability Test".

DETAILED DESCRIPTION OF THE INVENTION

Figure 1:
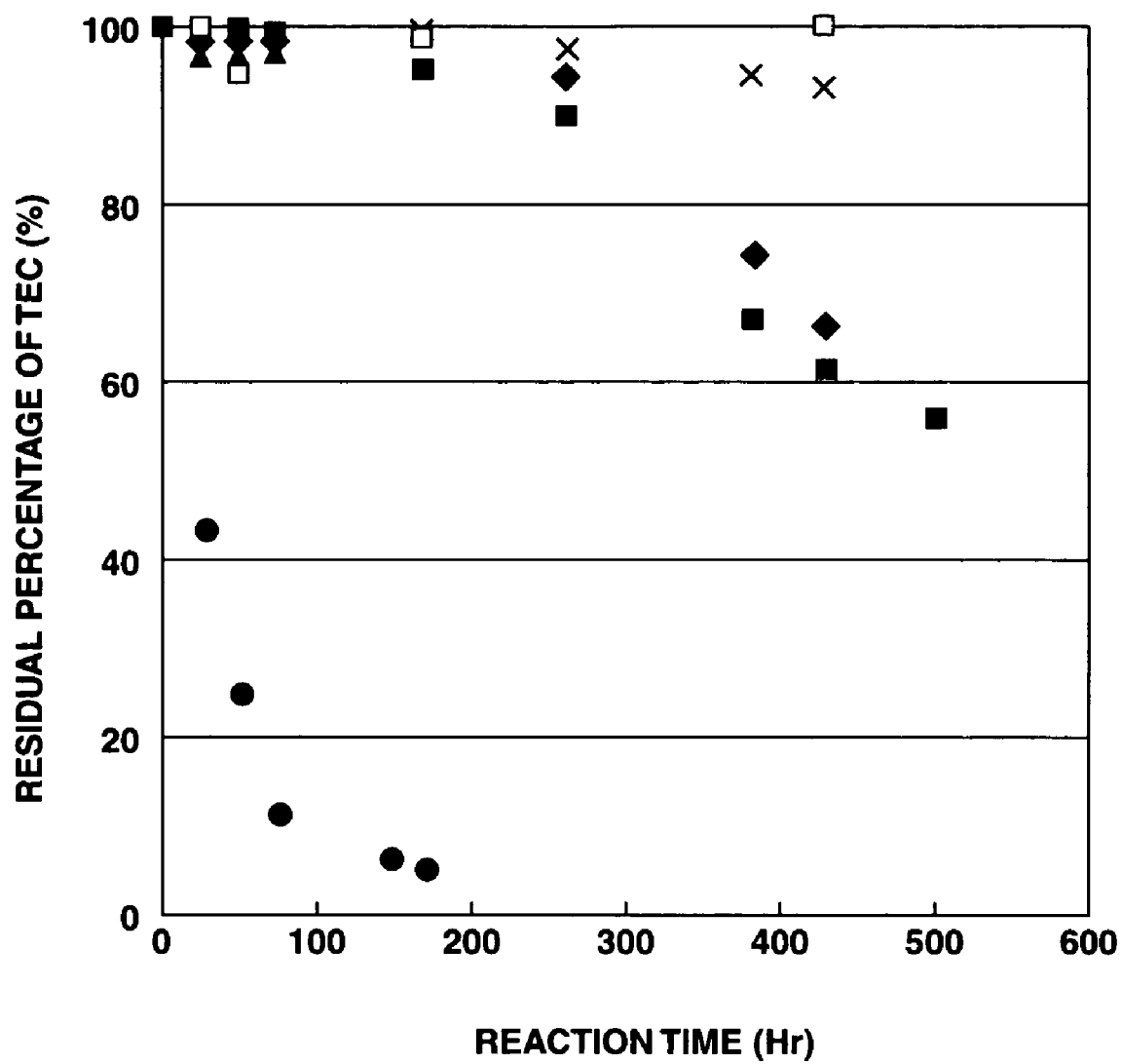
FIG. 1 is a graph showing a relationship between a reaction time and a residual percentage of trichloroethylene upon purification treatment of the trichloroethylene using iron composite particles obtained in Example 1 in which the mark "●" represents data of the iron composite obtained in Example 1.
Figure 2:
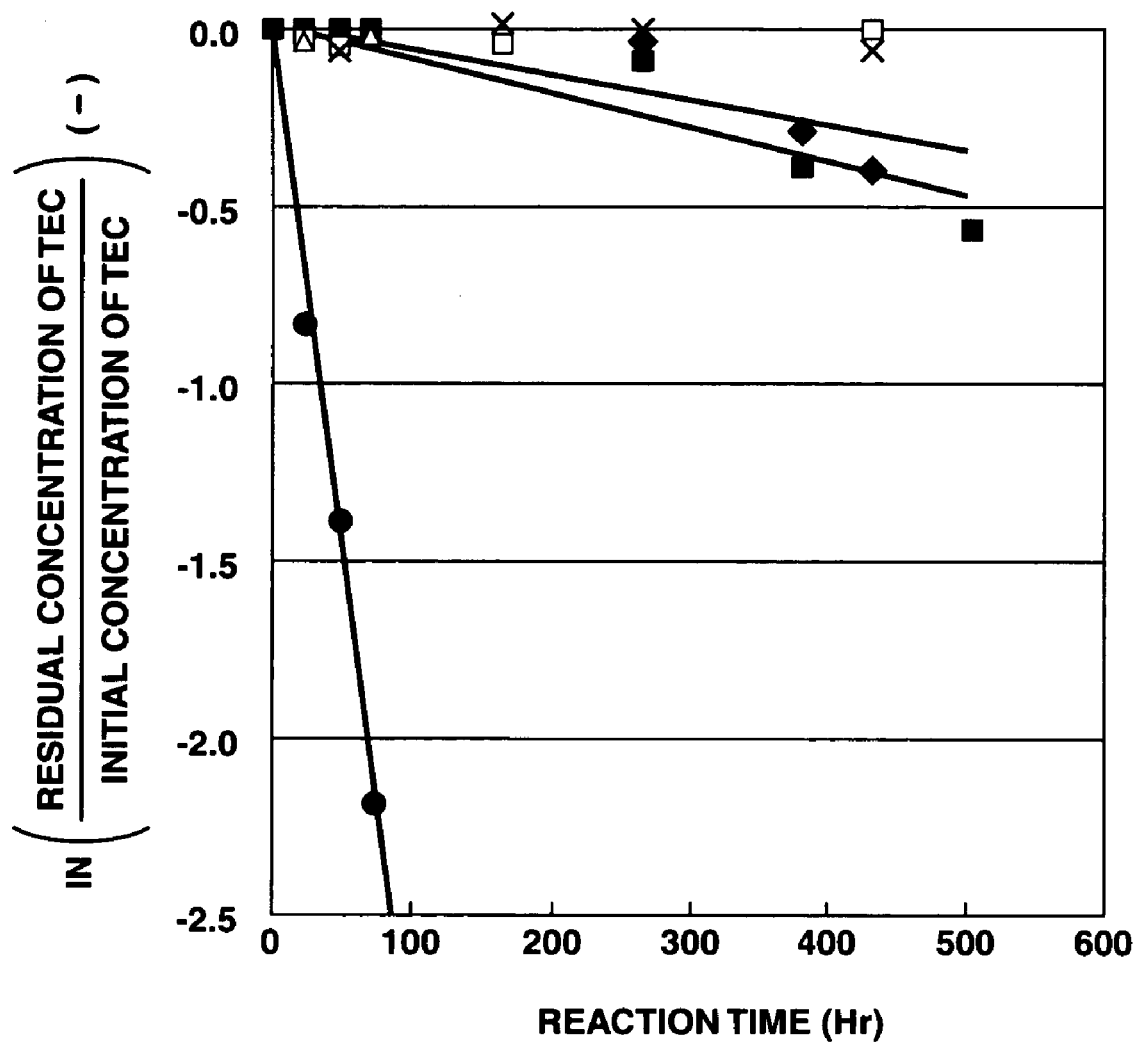
FIG. 2 is a graph showing a logarithmic value of a ratio of residual concentration to initial concentration of trichloroethylene with respect to a reaction time upon purification treatment of the trichloroethylene using iron composite particles obtained in Example 1 in which the mark "●" represents data of the iron composite obtained in Example 1.
Figure 3:
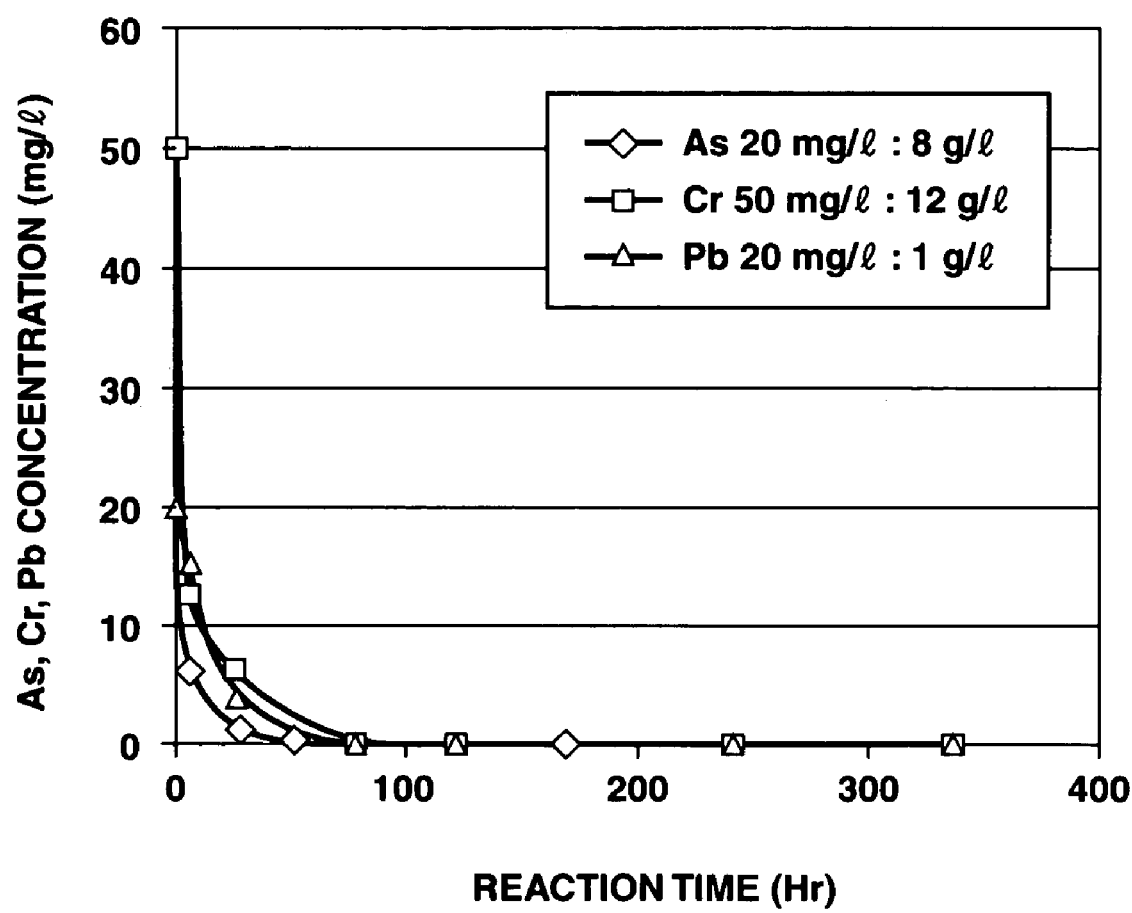
FIG. 3 is a graph showing arsenic, chromium and lead concentrations with respect to a reaction time upon preparation of a sample for measurement of heavy metals as well as upon evaluation for insolubilization reaction (measurement of apparent reaction rate constant) using iron composite particles obtained in Example 1.
Figure 4:
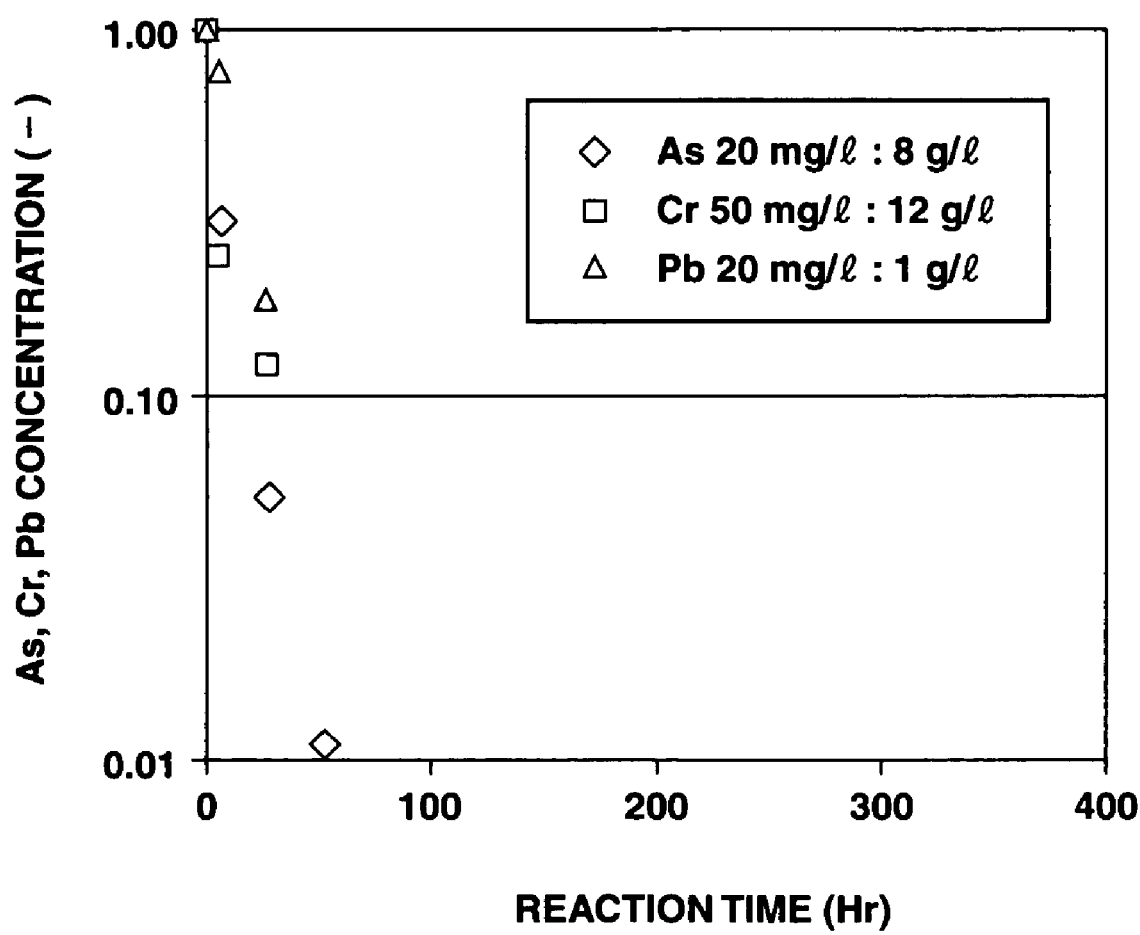
FIG. 4 is a graph showing logarithmic values of arsenic, chromium and lead concentrations with respect to a reaction time upon preparation of a sample for measurement of heavy metals as well as upon evaluation for insolubilization reaction (measurement of apparent reaction rate constant) using iron composite particles obtained in Example 1.
Figure 5:
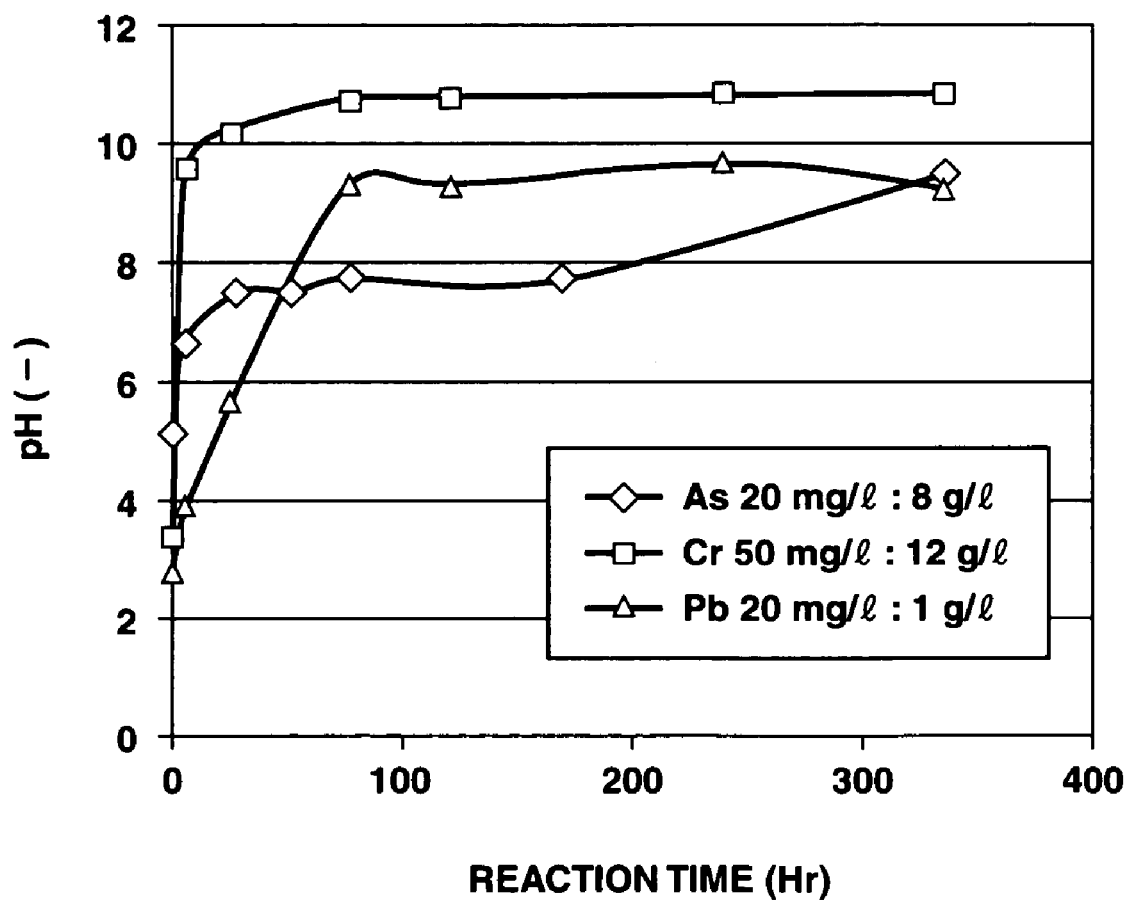
FIG. 5 is a graph showing pH values of arsenic, chromium and lead solutions with respect to a reaction time upon preparation of a sample for measurement of heavy metals as well as upon evaluation for insolubilization reaction (measurement of apparent reaction rate constant) using iron composite particles obtained in Example 1.
Figure 6:
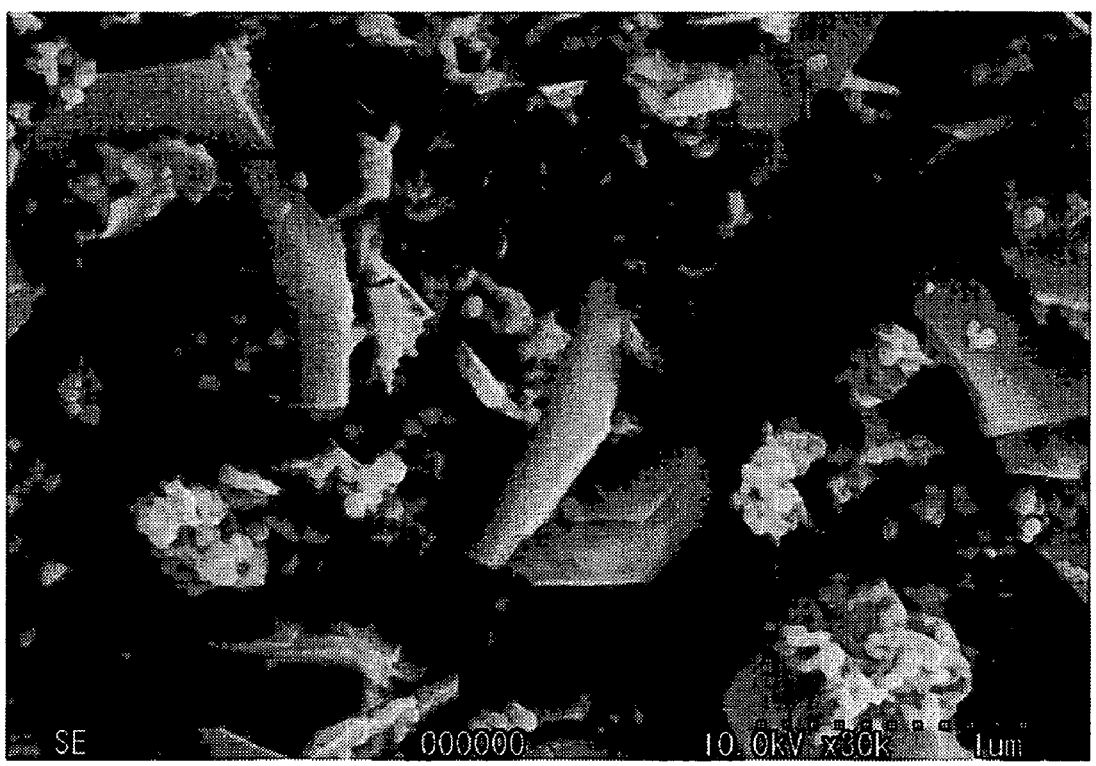
FIG. 6 is a scanning electron micrograph (magnification: ×30000) showing coarse particles produced in a purifying agent after preservation for 7 months.

The present invention is described in detail below. First, the iron composite particles for purifying soil or ground water according to the present invention (hereinafter referred to merely as "iron composite particles for purification") are described.

The iron composite particles for purification of the present invention is composed of an α-Fe phase and a $Fe_3O_4$ phase. The $Fe_3O_4$ content is adjusted such that the ratio of a diffraction intensity $D_{110}$ of (110) plane of α-Fe to a sum of a diffraction intensity $D_{311}$ of (311) plane of $Fe_3O_4$ and the diffraction intensity $D_{110}$ ($D_{110}/(D_{311}+D_{110})$) is usually 0.30 to 0.95, preferably 0.32 to 0.95 as measured from X-ray diffraction spectrum of the iron composite particles. When the intensity ratio ($D_{110}/(D_{311}+D_{110})$) of the iron composite particles immediately after production thereof is less than 0.30, the iron composite particles for purification tend to be insufficient in purification performance because of too low α-Fe phase content therein, thereby failing to attain the aimed effects of the present invention. When the intensity ratio ($D_{110}/(D_{311}+D_{110})$) is more than 0.95, although a sufficient amount of the α-Fe phase is present, the content of the $Fe_3O_4$ phase produced according to the present invention is lowered, so that the iron composite particles for purification tend to be early deteriorated in catalytic activity, and it is not possible to maintain a good catalytic activity thereof for a long period of time, thereby also failing to attain the aimed effects of the present invention. In addition, $Fe_3O_4$ is preferably present on the surface of the iron composite particles for purification.

The S content of the iron composite particles for purification according to the present invention is usually 3500 to 7000 ppm, preferably 3800 to 7000 ppm, more preferably 3800 to 6500 ppm. When the S content is less than 3500 ppm, the obtained iron composite particles for purification tend to be insufficient in purification performance for the organohalogen compounds, thereby failing to attain the aimed effects of the present invention. When the S content is more than 7000 ppm, although the obtained iron composite particles for purification show a sufficient purification performance for the organohalogen compounds, the purification effect due to the S content is already saturated, and the use of such a large S content is, therefore, uneconomical.

The Al content of the iron composite particles for purification according to the present invention is usually 0.10 to 1.50% by weight, preferably 0.20 to 1.20% by weight. When the Al content is less than 0.10% by weight, the obtained iron composite particles for purification tend to provide a hard granulated product due to volume shrinkage thereof, so that wet pulverization thereof tends to be difficult. When the Al content is more than 1.50% by weight, the reduction reaction tends to proceed too slowly and, therefore, require a long period of time. In addition, since crystal growth of the iron composite particles for purification is insufficient, the α-Fe phase contained therein tends to become unstable, and a too thick oxidation film tends to be formed on the surface of the particles. Further, since the phase change from the $Fe_3O_4$ phase to the α-Fe phase is insufficient upon the heat reduction reaction, it may be difficult to enhance the α-Fe phase content, thereby failing to attain the aimed effects of the present invention.

The purifying iron particles of the present invention preferably have a granular shape. In the process of the present invention, since the spindle-shaped or acicular goethite or hematite particles are directly subjected to heat reduction treatment, the particles undergo breakage of particle shape upon transformation into the α-Fe phase crystals, and are formed into a granular shape through isotropic crystal growth thereof. On the contrary, spherical particles have a smaller BET specific surface area than granular particles if the particle sizes thereof are identical and, therefore, exhibit a less catalytic activity than that of the granular particles. Therefore, the iron composite particles for purification preferably contain no spherical particles.

The iron composite particles for purification of the present invention have an average particle diameter of usually 0.05 to 0.50 µm, preferably 0.05 to 0.30 µm. When the average particle diameter of the iron composite particles for purification is less than 0.05 µm, the α-Fe phase tends to become unstable, resulting in formation of a thick oxidation film on the surface thereof, so that it may be difficult to increase the α-Fe phase content and attain the aimed effects of the present invention. When the average particle diameter of the iron composite particles for purification immediately after production thereof is more than 0.50 µm, although the α-Fe phase content is increased, the $Fe_3O_4$ phase content is relatively lowered, so that the iron composite particles for purification tend to be early deteriorated in catalytic activity, and it is not possible to maintain a good catalytic activity thereof for a long period of time. As a result, it may be difficult to retain the $Fe_3O_4$ phase content to such an extent capable of attaining the aimed effects of the present invention.

The crystallite size of (110) plane of α-Fe of the iron composite particles for purification according to the present invention is usually 200 to 400 Å, preferably 200 to 350 Å. When the crystallite size is less than 200 Å, it may be difficult to increase the α-Fe phase content, thereby failing to attain the aimed effects of the present invention. When the crystallite size is more than 400 Å, although the α-Fe phase content is increased, it may be difficult to retain the $Fe_3O_4$ phase content to such an extent capable of attaining the aimed effects of the present invention.

The BET specific surface area value of the iron composite particles for purification according to the present invention is usually 5 to 60 $m^2/g$, preferably 7 to 55 $m^2/g$. When the BET specific surface area value is less than 5.0 $m^2/g$, the contact area of the iron composite particles for purification tends to be decreased, thereby failing to show a sufficient catalytic activity. When the BET specific surface area value is more than 60 $m^2/g$, it may be difficult to increase the α-Fe phase content, thereby failing to attain the aimed effects of the present invention.

The iron composite particles for purification of the present invention have an Fe content of usually not less than 75% by weight, preferably 75 to 98% by weight based on the weight of the whole particles. When the Fe content is less than 75% by weight, the iron composite particles for purification tend to be deteriorated in catalytic activity, so that it may be difficult to attain the aimed effects of the present invention.

The iron composite particles for purification of the present invention preferably contain substantially no metal elements other than Fe such as Pb, Cd, As, Hg, Sn, Sb, Ba, Zn, Cr, Nb, Co, Bi, etc., since these metal elements exhibit a toxicity. In particular, in the consideration of high purity and catalyst performance, the iron composite particles for purification of the present invention preferably have a cadmium (Cd) elution of not more than 0.01 mg/L; no detected elution of whole cyanogen; a lead (Pb) elution of not more than 0.01 mg/L; a chromium (Cr) elution of not more than 0.05 mg/L; an arsenic (As) elution of not more than 0.01 mg/L; a whole mercury (Hg) elution of not more than 0.0005 mg/L; a selenium (Se) elution of not more than 0.01 mg/L; a fluorine (F) elution of not more than 0.8 mg/L; and a boron (B) elution of not more than 1 mg/L.

Also, the iron composite particles for purification of the present invention preferably have a cadmium and cadmium compound content of not more than 150 mg/kg; a cyanogen compound content of not more than 50 mg/kg; a lead and lead compound content of not more than 150 mg/kg; a chromium (IV) compound content of not more than 250 mg/kg; an arsenic and arsenic compound content of not more than 150 mg/kg; a mercury and mercury compound content of not more than 15 mg/kg; a selenium and selenium compound content of not more than 150 mg/kg; a fluorine and fluorine compound content of not more than 4000 mg/kg; and a boron and boron compound content of not more than 4000 mg/kg.

The iron composite particles for purification of the present invention have a saturation magnetization value of usually 85 to 155 $Am^2/kg$ (85 to 155 emu/g), preferably 90 to 155 $Am^2/kg$ (90 to 155 emu/g). When the saturation magnetization value is less than 85 $Am^2/kg$, the α-Fe phase content of the iron composite particles for purification tends to be lowered, thereby failing to attain the aimed effects of the present invention. When the saturation magnetization value is more than 155 $Am^2/kg$, although the α-Fe phase content is increased, it may be difficult to maintain the content of the $Fe_3O_4$ phase produced according to the present invention to such an extent capable of attaining the aimed effects of the present invention. As a result, since the $Fe_3O_4$ phase content is relatively lowered, the iron composite particles for purification tend to be early deteriorated in catalytic activity, and it is not possible to maintain a good catalytic activity thereof for a long period of time, thereby failing to readily accomplish the aims of the present invention.

Meanwhile, the iron composite particles for purification may be in the form of a granulated product.

Next, the purifying agent for purifying soil or ground water contaminated with organohalogen compounds (hereinafter referred to merely as "purifying agent"), is described.

The purifying agent of the present invention is in the form of a water suspension containing the above iron composite particles for purification as an effective ingredient. The content of the iron composite particles for purification in the water suspension may be appropriately selected from the range of usually 0.5 to 50 parts by weight, preferably 1 to 30 parts by weight based on 100 parts by weight of the water suspension.

When the content of the iron composite particles is more than 50 parts by weight, the viscosity of the purifying agent tends to be increased, thereby failing to smoothly transmit mechanical load or force upon stirring through the purifying agent and, therefore, uniformly mix the purifying agent. As a result, it may be difficult to control the concentration of the purifying agent.

When the particle size distribution of the iron composite particles constituting the purifying agent of the present invention is measured by a laser diffractometer, secondary particles of the iron composite particles preferably exhibit a particle size distribution with a single peak. When the particle size distribution of the secondary particles exhibits a plurality of peaks, the penetration velocity of the purifying agent into contaminated soil tends to become non-uniform, resulting in prolonged purification time, so that it may be difficult to attain the aimed effects of the present invention.

The secondary particles of the iron composite particles constituting the purifying agent of the present invention have a median diameter $D_{50}$ (particle diameter corresponding to an accumulative volume of particles of 50% as measured and accumulated with respect to respective particle diameters and expressed by percentage based on a total volume of the iron composite particles as 100%) of usually 0.5 to 5.0 µm, preferably 0.5 to 3.5 µm. Although the median diameter $D_{50}$ of the secondary particles is preferably as fine as possible, since the primary particles become finer particles and contain α-Fe, the resultant iron composite particles tend to be magnetically agglomerated. Also, it may be difficult to industrially produce such particles having a median diameter of less than 0.5 µm. When the median diameter of the secondary particles is more than 5.0 µm, the penetration into contaminated soil is too slow, so that it may be difficult to purify the soil for a short period of time, and attain the aimed effects of the present invention.

The secondary particles of the iron composite particles constituting the purifying agent of the present invention have a ratio of $D_{90}$ (particle diameter corresponding to an accumulative volume of particles of 90% as measured and accumulated with respect to respective particle diameters and expressed by percentage based on a total volume of the iron composite particles as 100%) to $D_{10}$ (particle diameter corresponding to an accumulative volume of particles of 10% as measured and accumulated with respect to respective particle diameters and expressed by percentage based on a total volume of the iron composite particles as 100%) ($D_{90}/D_{10}$) of usually 1.0 to 5.0, preferably 1.0 to 3.5. Although the ratio ($D_{90}/D_{10}$) is preferably as small as possible since the penetration velocity into contaminated soil is equalized and the purification velocity also becomes uniform, the lower limit thereof is 1.0 from industrial viewpoints. When the ratio ($D_{90}/D_{10}$) is more than 5.0, the penetration velocity into contaminated soil tends to become non-uniform, resulting in poor purification performance and prolonged purification time, so that it may be difficult to attain the aimed effects of the present invention.

The secondary particles of the iron composite particles contained in the purifying agent of the present invention have a distribution width $D_{84}$-$D_{16}$ (wherein $D_{84}$ represents a particle diameter corresponding to an accumulative volume of particles of 84% as measured and accumulated with respect to respective particle diameters and expressed by percentage based on a total volume of the iron composite particles as 100%, and $D_{16}$ represents a particle diameter corresponding to an accumulative volume of particles of 16% as measured and accumulated with respect to respective particle diameters and expressed by percentage based on a total volume of the iron composite particles as 100%) of usually 0.5 to 5.0 µm, preferably 0.5 to 3.5 µm. Although the distribution width $D_{84}$-$D_{16}$ is preferably as small as possible since the penetration velocity into contaminated soil is equalized and, therefore, the purification velocity also becomes uniform, the lower limit thereof is 0.5 µm from industrial viewpoints. When the distribution width $D_{84}$-$D_{16}$ is more than 5.0 µm, the penetration velocity into contaminated soil tends to become non-uniform, resulting in poor purification performance and prolonged purification time, so that it may be difficult to attain the aimed effects of the present invention.

The specific gravity of the purifying agent according to the present invention is usually 1.2 to 1.4. When the specific gravity is less than 1.2, the purifying agent tends to be uneconomical owing to a less solid content therein in the consideration of transportation and amount added to soil, etc. When the specific gravity is more than 1.4, the purifying agent has a too high viscosity in view of diameters of the primary and secondary particles contained therein and, therefore, may be difficult to industrially produce.

Meanwhile, the iron composite particles constituting the purifying agent tend to be formed into coarse particles during the preservation period of the purifying agent (hereinafter referred to as the "purifying agent after preservation"). The reason therefor is considered to be that iron present in the vicinity of the surface of the respective particles is oxidized so that the growth of oxidation film is caused. Namely, when the purifying agent is preserved for a long period of time, the Fe content in the iron composite particles is reduced and the magnetite content therein is increased. Notwithstanding the presence of the coarse particles, the iron composite particles can still maintain a good purification performance for the organohalogen compounds and/or heavy metals or the like.

In the present invention, the presence of the coarse particles is determined by measuring a maximum particle diameter of the iron composite particles recognized from a scanning electron micrograph thereof as mentioned below. The particle diameter of the coarse particles present in the iron composite particles is usually not more than 5.0 µm, preferably not more than 4.0 µm, more preferably not more than 3.5 µm. When the coarse particles contained in the iron composite particles have a particle diameter of more than 5.0 µm, the penetration of the purifying agent into contaminated soil tends to become extremely slow, so that it may be difficult to purify the contaminated soil for a short period of time, thereby failing to attain the aimed effects of the present invention.

The above purifying agent has the following properties (1) The iron composite particles contained in the purifying agent according to the present invention are composed of α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of usually 0.20 to 0.95 as measured from X-ray diffraction spectrum of the iron composite particles, an Al content of usually 0.10 to 1.50% by weight, an S content of usually 3500 to 7000 ppm, an average particle diameter of usually 0.05 to 0.5 µm, a particle diameter of coarse particles of usually 0.5 to 5.0 µm, a saturation magnetization value of usually 70 to 155 Am$^2$/kg, a crystallite size of (110) plane of α-Fe of usually 200 to 400 Å, and an Fe content of usually not less than 65% by weight based on the weight of whole particles.

(2) The iron composite particles contained in the purifying agent which is preserved for a period of, for example, less than one month, are composed of α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of usually 0.30 to 0.95, preferably 0.32 to 0.95 as measured from X-ray diffraction spectrum of the iron composite particles, an Al content of usually 0.10 to 1.50% by weight, preferably 0.20 to 1.20% by weight, an S content of usually 3500 to 7000 ppm, preferably 3800 to 6500 ppm, an average particle diameter of usually 0.05 to 0.50 µm, preferably 0.05 to 0.30 µm, a saturation magnetization value of usually 85 to 155 Am$^2$/kg, preferably 90 to 155 Am$^2$/kg, a crystallite size of (110) plane of α-Fe of usually 200 to 400 Å, preferably 200 to 350 Å, and an Fe content of usually not less than 75% by weight, preferably 75 to 98% by weight based on the weight of whole particles.

(3) The iron composite particles contained in the purifying agent which is preserved for a period of not less than one month and less than 3 months, are also composed of α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of usually 0.5 to 0.80 as measured from X-ray diffraction spectrum of the iron composite particles, an Al content of usually 0.10 to 1.50% by weight, an S content of usually 3500 to 7000 ppm, an average particle diameter of usually 0.05 to 0.50 µm, a particle diameter of coarse particles of usually 0.10 to 0.60 µm, a saturation magnetization value of usually 100 to 140 Am$^2$/kg, a crystallite size of (110) plane of α-Fe of usually 250 to 400 Å, and an Fe content of usually 70 to 80% by weight based on the weight of whole particles.

(4) The iron composite particles contained in the purifying agent which is preserved for a period of not less than 3 months and less than 6 months, are also composed of α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of usually 0.30 to 0.50 as measured from X-ray diffraction spectrum of the iron composite particles, an Al content of usually 0.10 to 1.50% by weight, an S content of usually 3500 to 7000 ppm, an average particle diameter of usually 0.05 to 0.50 μm, a particle diameter of coarse particles of usually 0.30 to 1.00 μm, a saturation magnetization value of usually 90 to 100 $Am^2/kg$, a crystallite size of (110) plane of α-Fe of usually 250 to 400 Å, and an Fe content of usually 70 to 80% by weight based on the weight of whole particles.

(5) The iron composite particles contained in the purifying agent which is preserved for a period of not less than 6 months and less than 12 months, are also composed of α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of usually 0.20 to 0.30 as measured from X-ray diffraction spectrum of the iron composite particles, an Al content of usually 0.10 to 1.50% by weight, an S content of usually 3500 to 7000 ppm, an average particle diameter of usually 0.05 to 0.50 μm, a particle diameter of coarse particles of usually 0.60 to 5.00 μm, a saturation magnetization value of usually 70 to 90 $Am^2/kg$, a crystallite size of (110) plane of α-Fe of usually 250 to 400 Å, and an Fe content of usually 70 to 80% by weight based on the weight of whole particles.

(6) The iron composite particles contained in the purifying agent which is preserved for a period of not less than twelve months, are also composed of α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of usually 0.20 to 0.30 as measured from X-ray diffraction spectrum of the iron composite particles, an Al content of usually 0.10 to 1.50% by weight, an S content of usually 3500 to 7000 ppm, an average particle diameter of usually 0.05 to 0.50 μm, a particle diameter of coarse particles of usually 1.00 to 5.00 μm, a saturation magnetization value of usually 70 to 90 $Am^2/kg$, a crystallite size of (110) plane of α-Fe of usually 200 to 300 Å, and an Fe content of usually 65 to 70% by weight based on the weight of whole particles.

Meanwhile, although it will be generally considered that the coarse iron composite particles grown-up after a long-term preservation show a deteriorated penetration into soil, unexpectedly, the purifying agent of the present invention can exhibit an excellent purification performance without deterioration in penetrability into soil notwithstanding the increase in particle diameter.

Also, the purifying agent of the present invention may contain sodium polyacrylate. The content of the sodium polyacrylate is usually 5 to 50% by weight, preferably 5 to 30% by weight (calculated as a solid content thereof) based on the weight of the iron composite particles.

When the content of the sodium polyacrylate is less than 5% by weight, the sodium polyacrylate may fail to sufficiently contribute to enhancement in penetrability of the purifying agent into soil due to such a low content of the sodium polyacrylate. When the content of the sodium polyacrylate is more than 50% by weight, the viscosity of the purifying agent tends to be increased, resulting in poor industrial productivity thereof. In addition, since such a high content of the sodium polyacrylate leads to deteriorated penetrability of the purifying agent upon injection thereof into soil, it may be difficult to attain the aimed effects of the present invention.

The sodium polyacrylate used in the present invention usually has a number-average molecular weight of 2000 to 10000, preferably 2500 to 8000. Specific examples of the sodium polyacrylate may include "GOOD-RITE K-739" produced by NOVEON CO., LTD., "JURYMER AC-10NP" produced by NIHON JUNYAKU CO., LTD., "JURYMER AC-103" produced by NIHON JUNYAKU CO., LTD., "AQUALIC DL-100" produced by NIPPON SHOKUBAI CO., LTD., etc.

In addition, the purifying agent of the present invention may be diluted 10 to 300 times such that the concentration of the iron composite particles contained therein is in the range of 0.1 to 200 g/L.

Further, the purifying agent of the present invention may contain sodium hydrogen carbonate, sodium sulfate or a mixture thereof. The concentration of sodium hydrogen carbonate contained in the purifying agent is usually 0.01 to 1.0% by weight, preferably 0.01 to 0.5% by weight, and the concentration of sodium sulfate contained therein is usually 0.01 to 1.0% by weight, preferably 0.04 to 1.0% by weight.

The purifying agent containing sodium polyacrylate can be considerably enhanced in penetrability into contaminated soil or ground water without substantial deterioration in purification performance. The reason therefor is considered to be that the sodium polyacrylate contained in the purifying agent acts for preventing magnetic agglomeration of the iron composite particles and reducing attraction force therebetween.

The above purifying agent is defined as follows:

(1) The purifying agent is a water suspension containing iron composite particles as an effective ingredient and sodium polyacrylate, in which the iron composite particles are composed of α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of usually 0.20 to 0.95, preferably 0.32 to 0.95 as measured from X-ray diffraction spectrum of the iron composite particles, an Al content of usually 0.10 to 1.50% by weight, preferably 0.20 to 1.20% by weight, an S content of usually 3500 to 7000 ppm, preferably 3800 to 6500 ppm, an average particle diameter of usually 0.05 to 0.5 μm, preferably 0.05 to 0.30 μm, a particle diameter of coarse particles of usually 0.5 to 5.0 μm, preferably 0.50 to 3.0 μm, a saturation magnetization value of usually 85 to 155 $Am^2/kg$, preferably 90 to 155 $Am^2/kg$, a crystallite size of (110) plane of α-Fe of usually 200 to 400 Å, preferably 200 to 350 Å, and an Fe content of usually not less than 65% by weight, preferable 70 to 80% by weight based on the weight of whole particles.

(2) The purifying agent preserved for a period of less than one month is a water suspension containing iron composite particles as an effective ingredient and sodium polyacrylate, in which the iron composite particles are composed of α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of usually 0.30 to 0.95, preferably 0.32 to 0.95 as measured from X-ray diffraction spectrum of the iron composite particles, an Al content of usually 0.10 to 1.50% by weight, preferably 0.20 to 1.20% by weight, an S content of usually 3500 to 7000 ppm, preferably 3800 to 6500 ppm, an average particle diameter of usually 0.05 to 0.50 μm, preferably 0.05 to 0.30 μm, a saturation magnetization value of usually 85 to 155 $Am^2/kg$, preferably 90 to 155 $Am^2/kg$, a crystallite size of (110) plane of α-Fe of usually 200 to 400 Å, preferably 200 to 350 Å, and an Fe content of usually not less than 75% by weight, preferably 75 to 98% by weight based on the weight of whole particles.

(3) The purifying agent preserved for a period of not less than one month and less than 3 months is a water suspension containing iron composite particles as an effective ingredient and sodium polyacrylate, in which the iron composite particles are also composed of α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of usually 0.50 to 0.80 as measured from X-ray diffraction spectrum of the iron composite particles, an Al content of usually 0.10 to 1.50% by weight, an S content of usually 3500 to 7000 ppm, an average particle diameter of usually 0.05 to 0.50 μm, a particle diameter of coarse particles of usually 0.10 to 0.60 μm, a saturation magnetization value of usually 100 to 140 $Am^2/kg$, a crystallite size of (110) plane of α-Fe of usually 250 to 400 Å, and an Fe content of usually 70 to 80% by weight based on the weight of whole particles.

(4) The purifying agent preserved for a period of not less than 3 months and less than 6 months is a water suspension containing iron composite particles as an effective ingredient and sodium polyacrylate, in which the iron composite particles are also composed of α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of usually 0.30 to 0.50 as measured from X-ray diffraction spectrum of the iron composite particles, an Al content of usually 0.10 to 1.50% by weight, an S content of usually 3500 to 7000 ppm, an average particle diameter of usually 0.05 to 0.50 μm, a particle diameter of coarse particles of usually 0.30 to 1.00 μm, a saturation magnetization value of usually 90 to 100 $Am^2/kg$, a crystallite size of (110) plane of α-Fe of usually 250 to 400 Å, and an Fe content of usually 70 to 80% by weight based on the weight of whole particles.

(5) The purifying agent preserved for a period of not less than 6 months and less than 12 months is a water suspension containing iron composite particles as an effective ingredient and sodium polyacrylate, in which the iron composite particles are also composed of α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of usually 0.20 to 0.30 as measured from X-ray diffraction spectrum of the iron composite particles, an Al content of usually 0.10 to 1.50% by weight, an S content of usually 3500 to 7000 ppm, an average particle diameter of usually 0.05 to 0.50 μm, a particle diameter of coarse particles of usually 0.60 to 5.00 μm, a saturation magnetization value of usually 70 to 90 $Am^2/kg$, a crystallite size of (110) plane of α-Fe of usually 250 to 400 Å, and an Fe content of usually 70 to 80% by weight based on the weight of whole particles.

(6) The purifying agent preserved for a period of not less than 12 months is a water suspension containing iron composite particles as an effective ingredient and sodium polyacrylate in which the iron composite particles are also composed of α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of usually 0.20 to 0.30 as measured from X-ray diffraction spectrum of the iron composite particles, an Al content of usually 0.10 to 1.50% by weight, an S content of usually 3500 to 7000 ppm, an average particle diameter of usually 0.05 to 0.50 μm, a particle diameter of coarse particles of usually 1.00 to 5.00 μm, a saturation magnetization value of usually 70 to 90 $Am^2/kg$, a crystallite size of (110) plane of α-Fe of usually 200 to 300 Å, and an Fe content of usually 65 to 70% by weight based on the weight of whole particles.

(7) The diluted purifying agent is a water suspension containing iron composite particles as an effective ingredient which are composed of α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of usually 0.20 to 0.98, preferably 0.30 to 0.95 as measured from X-ray diffraction spectrum of the iron composite particles, an Al content of usually 0.10 to 1.50% by weight, preferably 0.20 to 1.20% by weight, an S content of usually 3500 to 7000 ppm, preferably 3800 to 6500 ppm, and an average particle diameter of usually 0.05 to 0.50 μm, preferably 0.05 to 0.30 μm, in which the concentration of the iron composite particles in the water suspension is diluted to usually 0.1 to 200 g/L, preferably 0.5 to 100 g/L.

(8) The purifying agent is a water suspension containing iron composite particles as an effective ingredient and sodium hydrogen carbonate, sodium sulfate or a mixture thereof, in which the iron composite particles are composed of α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of usually 0.20 to 0.98, preferably 0.30 to 0.98, as measured from X-ray diffraction spectrum of the iron composite particles, an Al content of usually 0.10 to 1.50% by weight, preferably 0.20 to 1.20% by weight, an S content of usually 3500 to 7000 ppm, preferably 3800 to 6500 ppm, and an average particle diameter of usually 0.05 to 0.50 μm, preferably 0.05 to 0.30 μm, in which the concentration of the iron composite particles in the water suspension is diluted to usually 0.1 to 200 g/L, preferably 0.5 to 100 g/L.

Next, the process for producing the purifying iron composite particles for purifying soil or ground water contaminated with organohalogen compounds according to the present invention, is described.

The goethite particles can be produced by ordinary methods, for example, by passing an oxygen-containing gas such as air through a suspension containing a ferrous-containing precipitate such as hydroxides or carbonates of iron which is obtained by reacting a ferrous salt-containing aqueous solution with at least one compound selected from the group consisting of alkali hydroxides, alkali carbonates and ammonia.

Meanwhile, in order to obtain the purifying iron composite particles having a less amount of impurities, as the ferrous salt-containing aqueous solution, there are preferably used high-purity solutions that are reduced in content of impurities such as heavy metals.

For reducing the amount of impurities contained in the ferrous salt-containing aqueous solution, there may be used, for example, a method in which a steel plate is washed with sulfuric acid to dissolve out, thereby removing impurities, rust-preventive oils or the like which are deposited on the surface thereof, and then the resultant impurity-free steel plate is dissolved to prepare a high-purity aqueous ferrous salt solution. On the other hand, the use of materials obtained by acid-washing scrap irons containing a large amount of metal impurities other than iron, steel plates subjected to plating treatment, phosphate treatment or chromic acid treatment for improving corrosion resistance thereof, or steel plates coated with rust-preventive oils, is undesirable. This is because impurities tend to remain in the obtained iron composite particles, thereby causing such a risk that the impurities is eluted from the iron composite particles into soil or ground water to be purified. Alternatively, there may also be used a method of adding alkali such as alkali hydroxides to a ferrous sulfate solution by-produced from titanium oxide production process, etc., to adjust the pH value thereof; insolubilizing and precipitating titanium as well as other impurities in the from of hydroxides thereof; and then removing the resultant precipitates from the reaction solution by ultra-filtration, etc. Among these methods, the method of dissolving the steel plate having a less amount of impurities with sulfuric acid is preferred, and the method is more preferably followed by removing the impurities from the obtained aqueous ferrous salt solution by adjusting the pH value thereof. All of the above-described methods are industrially applicable without problems and are also advantageous from economical viewpoints.

The goethite particles used in the present invention have an average major axis diameter of usually 0.05 to 0.50 μm and an S content of usually 2200 to 4500 ppm, and may be either spindle-shaped particles or acicular particles. In addition, the goethite particles have an aspect ratio of usually 4:1 to 30:1, more preferably 5:1 to 25:1, and a BET specific surface area of usually 20 to 200 m²/g, preferably 25 to 180 m²/g.

In the present invention, it is important to incorporate Al into the goethite particles or coat the goethite particles with Al. The incorporation or coating of Al allows a granulated product of the goethite particles to exhibit a limited volume shrinkage, resulting in well-controlled hardness of the granulated product. Therefore, wet pulverization of the granulated product of the goethite particles can be facilitated. Further, the size of primary particles of the goethite particles can be relatively reduced, resulting in relatively large specific surface area thereof as well as enhancement in purification performance.

The amount of Al incorporated into or coated on the goethite particles is usually 0.06 to 1.00% by weight.

The goethite particles are preferably previously granulated by ordinary methods. The granulated goethite particles become usable in a fixed bed-type reducing furnace. Further, the iron composite particles obtained from the granulated goethite particles can still maintain a shape of the granulated product under some reducing conditions and, therefore, can be suitably used for filling into columns, etc.

The hematite particles are obtained by heat-dehydrating the goethite particles at a temperature of 250 to 350° C.

The S content of the hematite particles can be well controlled by using goethite particles previously having a high S content. Also, in the case of the goethite particles having a low S content, the S content of the hematite particles may be controlled by adding sulfuric acid to a water suspension containing the hematite particles.

The thus obtained hematite particles have an average major axis diameter of usually 0.05 to 0.50 μm, and an S content of usually 2400 to 5000 ppm. The amount of Al contained in or coated on the hematite particles is usually 0.07 to 1.13% by weight.

The goethite particles or the hematite particles are heat-reduced at a temperature of usually 350 to 600° C. to produce iron particles (α-Fe).

When the heat-reducing temperature is less than 350° C., the reduction reaction tends to proceed too slowly, resulting in a prolonged reduction reaction time. Even though the BET specific surface area of the particles may be increased under such a low temperature condition to facilitate the reduction reaction, a sufficient crystal growth of the particles tends to be inhibited, resulting in formation of unstable α-Fe phase and thick oxidation film on the surface of the particles, or insufficient phase transfer from $Fe_3O_4$ phase to α-Fe phase. As a results, it may be difficult to increase the α-Fe phase content. When the heat-reducing temperature is more than 600° C., the reduction reaction tends to proceed too rapidly, so that sintering within or between the particles is excessively accelerated, resulting in a too large particle size and a too small BET specific surface area of the obtained particles.

Meanwhile, as the heating atmosphere upon the reduction reaction, there may be used hydrogen gas, nitrogen gas or the like. Among these atmospheres, hydrogen gas is preferred from industrial viewpoints.

The iron particles obtained after the heat-reduction are cooled, and then taken out and transferred into water without forming an oxidation film (layer) on the surface of the iron particles in a gas phase. Thereafter, the oxidation film (layer) is formed on the surface of the iron particles in water, and the thus obtained iron particles having the oxidation film (layer) thereon are then dried.

As the cooling atmosphere, there may be used either nitrogen or hydrogen. However, at a final stage of the cooling, the atmosphere is preferably changed to nitrogen atmosphere. When the iron particles are transferred into water, the iron particles are preferably cooled to a temperature of not more than 100° C.

The drying atmosphere may be appropriately selected from nitrogen, air, vacuum, etc. The drying temperature is usually not more than 100° C.

In the above heat-reduction treatment, the particles are transformed into iron particles composed of α-Fe phase as a whole. When transferring the iron particles into water, water is decomposed into oxygen and hydrogen by catalytic activity of the α-Fe. As a result, it is considered that the α-Fe is oxidized by the oxygen generated, so that an oxidation film (layer) composed of $Fe_3O_4$ is formed on the surface of the particles.

Next, the process for producing the purifying agent for purifying soil or ground water contaminated with organohalogen compounds according to the present invention, is described. In the process of the present invention, the iron particles obtained after the heat-reduction are cooled, and then taken out and transferred into water. The resultant water suspension containing the iron composite particles can be directly used as a purifying agent.

The purifying agent of the present invention is preferably in the form of a dispersion obtained by dispersing pulverized secondary agglomerates of the iron composite particles in water.

Thus, the iron composite particles are preferably pulverized by wet pulverization method in the consideration of agglomeration condition, properties (high-activity), particle size, capacity of pulverizer (particle size of product and amount pulverized) and final configuration of the iron composite particles.

The iron particles obtained after the heat-reduction treatment are cooled, and then taken out and transferred in water, in which the iron particles are oxidized to form an oxidation film on the surface thereof. Thereafter, the thus obtained iron composite particles are suitably wet-pulverized.

As the pulverizer usable in the present invention, in the case where grinding media are employed, there may be used media-stirring type mills including vessel-drive type mills, e.g., rolling mills such as pot mill, tube mill, conical mill, vibration mills such as fine vibration mill, or the like; and media-agitation type mills, e.g., tower type mills such as tower mill, agitation tank type mills such as attritor, flowing tube type mills such as sand grind mill, annular type mills such as annular mill, or the like. In the case where no grinding media are employed, there may be used shear/friction type mills, e.g., vessel rotating type mills such as Wong mill, wet high-speed rotation type mills such as colloid mill, homomixer and line mixer, or the like.

In general, the pulverization means a procedure of crushing raw materials having a size of not more than 25 mm into particles, and generally classified into coarse pulverization, minute pulverization and fine pulverization. The coarse pulverization is to pulverize the raw materials into particles having a size of 5 mm to 20 mesh, the minute pulverization is to pulverize the raw materials into particles containing small particles having a size of not more than 200 mesh in an amount of about 90%, and the fine pulverization is to pulverize the raw materials into particles containing fine particles having a size of not more than 325 mesh in an amount of about 90%. Further, there is known an ultrafine pulverization in which the raw materials are pulverized into several microns. In the present invention, the iron composite particles are preferably successively subjected to three pulverization treatments including the coarse pulverization, minute pulverization and fine pulverization.

The coarse pulverization may be carried out using a stirrer of a low-speed rotation type, a medium-speed rotation type, a high-speed rotation shearing type or a high- and low-speed combined rotation type which is inserted into an agitation tank equipped with a baffle. In particular, in the consideration of pulverization of agglomerates of the iron composite particles, the medium- to high-speed rotation type stirrer that can be operated at 1000 to 6000 rpm is preferably used. As the blade of these stirrers, there may be used disk turbine, fan turbine, arrow feather-shaped turbine, propeller-type turbine, etc. Of these stirrers, preferred are edged disk turbines, for example, homodisper manufactured by Tokushu Kika Kogyo Co., Ltd.

The minute or fine pulverization may be carried out using a batch type apparatus or a continuous type apparatus. Of these apparatuses, the continuous type apparatus is preferred from industrial viewpoints. The minute or fine pulverization using grinding media may be carried out using ball mill, tower mill, sand grind mill, attritor or the like. Also, the minute or fine pulverization using no grinding media may be carried out using homomixer, line mixer or the like.

In the minute pulverization, there may be used such a pulverizer having a multi-stage structure which includes the combination of a stator and a rotor provided at its outer periphery with a plurality of slits as a shaft-fixing surface portion into which cutter blades are fitted. In particular, a continuous shear dispersing apparatus such as media-less line mixer whose rotor is rotated at a peripheral speed of not less than 30 m/s, for example, "Homomic Line Mixer" manufactured by Tokushu Kika Kogyo Co., Ltd., is preferred.

The fine pulverization (finish pulverization) may be carried out using a media type dispersing apparatus such as a sand grind mill in which a plurality of disks fitted on a rotating axis disposed at a center of a cylindrical vessel filled with $\phi 1$ to $\phi 3$ grinding media at a filling percentage of 70 to 80%, are rotated to cause a rapid rotation action of the media through which materials to be treated are passed from underneath to above. For example, a sand grinder manufactured by Imex Inc., is more preferred.

In the wet pulverization of the present invention, in order to accelerate formation of cracks in the particles and inhibition of rebinding the pulverized particles, or in order to prevent the particles from being agglomerated into granular particles which are difficult to pulverize, or prevent the particles from being adhered onto balls or mills which may cause deterioration in pulverizing force thereof, suitable pulverizing assistants may be appropriately added to the particles to be pulverized. The pulverizing assistants may be in the form of either solid or liquid. Examples of the solid pulverizing assistants may include stearic acid salts, colloidal silica, colloidal carbon or the like. Examples of the liquid pulverizing assistants may include triethanolamine, alkyl sulfonates or the like.

The concentration of the iron composite particles contained in the water suspension upon the wet pulverization is usually 20 to 40% by weight. When the concentration of the iron composite particles is less than 20% by weight, it may be difficult to apply a suitable stress such as shear force upon the pulverization, thereby failing to pulverize the iron composite particles into the aimed particle size, or resulting in prolonged pulverization time. Further, the grinding media required for the wet pulverization may suffer from severe abrasion. When the concentration of the iron composite particles is more than 40% by weight, the water suspension may exhibit a too high viscosity, thereby requiring a large mechanical load, so that it may be difficult to industrially produce the aimed particles.

The purifying agent containing sodium polyacrylate may be produced by dissolving sodium polyacrylate in water to prepare an aqueous sodium polyacrylate solution, and then adding the thus prepared solution into the water suspension containing the iron composite particles.

Also, the purifying agent containing sodium hydrogen carbonate and/or sodium sulfate is preferably produced by diluting the purifying agent obtained by the above production method with an appropriate diluent, and then adding a predetermined amount of sodium hydrogen carbonate and/or sodium sulfate into the diluted purifying agent. In this case, as the diluent, there may be used ion-exchanged water.

Next, the method for purifying soil or ground water contaminated with organohalogen compounds according to the present invention, is described.

The purification treatment of soil or ground water contaminated with organohalogen compounds is generally classified into the "in-situ decomposition" method in which contaminants contained therein are directly decomposed under the ground, and the "in-situ extraction" method in which soil or ground water containing contaminants is excavated or extracted and then the contaminants contained therein are decomposed in place. In the present invention, both of these methods are usable.

In the in-situ decomposition method, the purifying iron composite particles or the purifying agent may be directly penetrated into the underground, or introduced into the underground through drilled bore, using a transferring medium including gas media such as high-pressure air and nitrogen or water. In particular, since the purifying agent of the present invention is in the form of a water suspension, the purifying agent may be directly used, or may be used in the form of a diluted solution.

In the in-situ extraction method, the excavated soil may be mixed and stirred with the purifying iron composite particles or the purifying agent using sand mill, Henschel mixer, concrete mixer, Nauter mixer, single- or twin-screw kneader type mixer, or the like. Also, the pumped ground water may be passed through a column, etc., which are filled with the purifying iron composite particles.

The concentration of the purifying iron composite particles or the purifying agent added may be appropriately determined according to the degree of contamination of soil or ground water with organohalogen compounds. In the case where contaminated soil is to be purified, the concentration of the purifying iron composite particles or the purifying agent added is usually 0.1 to 200 g/L, preferably 0.5 to 100 g/L based on 1000 g of the soil. When the concentration of the purifying iron composite particles or the purifying agent added is less than 0.1 g/L, it may be difficult to attain the aimed effects of the present invention. When the concentration of the purifying iron composite particles or the purifying agent added is more than 200 g/L, although the purification effect is enhanced, the use of such a large amount of the purifying iron composite particles or the purifying agent is uneconomical. Also, in the case where contaminated ground water is to be purified, the concentration of the purifying iron composite particles or the purifying agent added is usually 0.1 to 200 g/L, preferably 0.5 to 100 g/L based on 1000 g of the ground water.

When the organohalogen compounds contained in the soil or ground water are purified using the purifying iron composite particles or the purifying agent of the present invention, the apparent reaction rate constant can be increased to not less than 0.005 $h^{-1}$ as measured by the below-mentioned evaluation method.

Next, the method for purifying soil or ground water contaminated with harmful heavy metals or the like according to the present invention, is described.

The soil or ground water contaminated with harmful heavy metals or the like may be purified by the "containment" method. In the present invention, both of "in-situ containment" and "containment after excavation" methods are applicable.

In the "in-situ containment" method, a mixture of the purifying iron composite particles and water or the purifying agent may be directly penetrated into the underground, or introduced into the underground through drilled bore, using gas media such as high-pressure air and nitrogen. Since the purifying agent is in the form of a water suspension, the purifying agent may be directly used, or may be used in the form of a diluted solution, if required.

In the "containment after excavation" method, a mixture of the purifying iron composite particles and water or the purifying agent may be mixed and stirred with contaminated soil using sand mill, Henschel mixer, concrete mixer, Nauter mixer, single- or twin-screw kneader type mixer, or the like, thereby incorporating the heavy metals or the like contained in the soil into ferrite as produced, and then confining the heavy metals or the like therein. Meanwhile, if required, the ferrite in which the heavy metals are incorporated and confined may be magnetically separated from the soil.

The concentration of the purifying iron composite particles or the purifying agent added may be appropriately determined according to the degree of contamination of soil or ground water with harmful heavy metals or the like. In the case where contaminated soil is to be purified, the concentration of the purifying iron composite particles or the purifying agent added is usually 0.1 to 200 g/L, preferably 0.5 to 100 g/L based on 1000 g of the soil. When the concentration of the purifying iron composite particles or the purifying agent added is less than 0.1 g/L, it may be difficult to attain the aimed effects of the present invention. When the concentration of the purifying iron composite particles or the purifying agent added is more than 200 g/L, although the purification effect is enhanced, the use of such a large amount of the purifying iron composite particles or the purifying agent is uneconomical. Also, in the case where contaminated ground water is to be purified, the concentration of the purifying iron composite particles or the purifying agent added is usually 0.1 to 200 g/L, preferably 0.5 to 100 g/L based on 1000 g of the ground water.

In addition, in the case where the purifying agent used contains any of sodium polyacrylate, sodium hydrogen carbonate and sodium sulfate, the solid content of the iron composite particles in the purifying agent is preferably 0.1 to 200 g/L, more preferably 0.5 to 100 g/L.

When the harmful heavy metals or the like contained in the soil or ground water are purified or insolubilized using the purifying iron composite particles or the purifying agent of the present invention, the apparent reaction rate constant can be increased to not less than 0.01 $h^{-1}$ for arsenic, not less than 0.01 $h^{-1}$ for chromium and not less than 0.05 $h^{-1}$ for lead as measured by the below-mentioned evaluation method.

In the case where the purifying agent of the present invention is penetrated into soil, the penetration percentage thereof can be increased to not less than 100%, more preferably not less than 200% as measured by the below-mentioned evaluation method.

The point of the present invention is that by using the purifying iron composite particles or the purifying agent of the present invention, organohalogen compounds contained in soil or ground water can be effectively and economically decomposed.

The reasons why the organohalogen compounds contained in soil or ground water can be effectively decomposed, are considered as follows, though it is not clearly determined.

That is, it is considered that in the purifying iron composite particles of the present invention, since the α-Fe phase (0 valence) and $Fe_3O_4$ phase are present therein at a specific ratio, and a part of sulfur is present in a 0 valence form through the heat reduction step, the iron composite particles can exhibit a high reducing activity and, therefore, contribute to the decomposition reaction of the organohalogen compounds.

In the present invention, by adding a specific amount of the Al compound to the purifying iron composite particles, the iron composite particles can be enhanced in decomposition activity to the organohalogen compounds. The reason therefor is considered as follows, though it is not clearly determined. That is, by incorporating Al into the iron composite particles, the primary particles thereof become finer, and agglomerates of the iron composite particles show a lower strength as compared to the conventional particles. Therefore, it becomes possible to wet-pulverize the iron composite particles into fine particles with a less difficulty as compared to the case where the same pulverization method is applied to the conventional particles. As a result, it is considered that since the iron composite particles are readily penetrated and dispersed into the soil or ground water, the decomposition activity to organohalogen compounds which is inherent to the iron composite particles can be sufficiently exhibited.

As described above, since the purifying iron composite particles of the present invention exhibit a high catalytic activity, the purification treatment can be efficiently performed for a short period of time. In particular, the purifying iron composite particles of the present invention are suitable for purifying the soil or ground water contaminated with a high-concentration organohalogen compounds.

Also, since the purifying iron composite particles of the present invention have a fine particle size and a high activity, α-Fe contained therein is readily dissolved at ordinary temperature without heating. Further, since the iron composite particles allows water contained in the soil or ground water to be efficiently decomposed into hydrogen or hydroxyl groups, a local alkaline region is always present in the soil or ground water, so that the dissolution reaction of α-Fe can proceed gradually. Then, the dissolved α-Fe is continuously reacted with the harmful heavy metals or the like on the interfacial region of the iron composite particles while incorporating hydroxyl groups and oxygen produced by the decomposition of water or dissolved oxygen thereinto. As a result, it is considered by the present inventors that formation of spinel ferrite is continuously caused so that the harmful heavy metals or the like are incorporated and insolubilized therein. Further, it is also considered that S contained in the iron composite particles also contributes to local dissolution of α-Fe.

In addition, it is considered by the present inventors that the ferrite formation reaction between the dissolved α-Fe and the harmful heavy metals or the like causes an epitaxial growth of particles around spinel magnetite present in the surface layer as a seed, resulting in efficient insolubilization of the harmful heavy metals or the like.

In the present invention, since any forcible oxidation treatments such as pH adjusting treatment by addition of acid or alkali, heat treatment and air-blowing treatment are not required, the harmful heavy metals or the like can be efficiently insolubilized.

Further, in the present invention, the insolubilized heavy metals or the like can be prevented from being eluted out again as described in Examples below. Therefore, the insolubilized heavy metals or the like can be kept in a harmless state for a long period of time.

As described above, the purifying iron composite particles of the present invention enable the organohalogen compounds and/or heavy metals or the like to be efficiently decomposed and insolubilized, and are, therefore, suitable as a purifying agent for soil or ground water.

Also, the purifying agent of the present invention containing sodium polyacrylate can be improved in penetrability into soil, and the purifying agent containing sodium hydrogen carbonate and/or sodium sulfate can also be improved in penetrability into soil.

Further, in the case where the purifying agent of the present invention contains sodium polyacrylate, the penetrability of the purifying agent into soil can be remarkably enhanced. As a result, the number of injection sites of the purifying agent can be reduced, and the working efficiency can be enhanced, resulting in shortened working period and economically advantageous purification treatment.

In addition, in the case where the purifying agent of the present invention contains sodium hydrogen carbonate and/or sodium sulfate, the penetrability of the purifying agent into soil can also be remarkably enhanced. As a result, the number of injection sites of the purifying agent can be reduced, and the working efficiency can be enhanced, resulting in shortened working period and economically advantageous purification treatment.

EXAMPLES

The present invention is described in more detail by Examples and Comparative Examples, but the Examples are only illustrative and, therefore, not intended to limit the scope of the present invention.

Various properties were evaluated by the following methods.

(1) The average major axis diameter and the aspect ratio of goethite particles were measured from a transmission electron micrograph thereof (magnification: ×30000). The average particle diameters of hematite particles and iron composite particles were measured from a scanning electron micrograph thereof (magnification: ×30000).

(2) The Fe and Al contents in the iron composite particles as well as the As, Cr and Pb contents in a filtrate obtained by the solid-liquid separation after the insolubilization of heavy metals or the like, were measured using an inductively coupled high-frequency plasma atomic emission spectroscope "SPS-4000" manufactured by Seiko Denshi Kogyo Co., Ltd.

(3) The S content of the respective particles was measured using "Carbon and Sulfur Analyzer EMIA-2200" manufactured by Horiba Seisakusho Co., Ltd.

(4) The crystal phase of the respective particles was identified by measuring a crystal structure of the particles in the range of 10 to 90° by X-ray diffraction method.

(5) The peak intensity ratio of the iron composite particles was determined by measuring a diffraction intensity $D_{110}$ of (110) plane of α-Fe and a diffraction intensity $D_{311}$ of (311) plane of magnetite from the results of the above X-ray diffraction measurement and calculating a ratio of $D_{110}/(D_{311}+D_{110})$.

(6) The crystallite size ((110) plane of α-Fe) of the iron composite particles was expressed by the thickness of crystallite in the direction perpendicular to each crystal plane of the particles as measured by X-ray diffraction method. The thickness value was calculated from the X-ray diffraction peak curve prepared with respect to each crystal plane according to the following Scherrer's formula:

$$\text{Crystallite Size } D_{110} = K\lambda/\beta \cos\theta$$

wherein β is a true half value-width of the diffraction peak which was corrected as to the width of machine used (unit: radian); K is a Scherrer constant (=0.9); λ is a wavelength of X-ray used (Cu Kα-ray 0.1542 nm); and θ is a diffraction angle (corresponding to diffraction peak of each crystal plane).

(7) The specific surface area of the respective particles was expressed by the value measured by BET method using "Monosorb MS-11" manufactured by Cantachrom Co., Ltd.

(8) The saturation magnetization value of the iron composite particles was measured using a vibration sample magnetometer "VSM-3S-15" manufactured by Toei Kogyo Co., Ltd., by applying an external magnetic field of 795.8 kA/m (10 kOe) thereto.

(9) The particle size distribution of the iron composite particles contained in the purifying agent was measured by a laser scattering diffraction type device "NIKKISO MICROTRAC HRA MODEL 9320-X100" manufactured by Nikkiso Co., Ltd. Meanwhile, upon the measurement, ethanol and organosilane were used as dispersing solvent and dispersant, respectively, and the particles were dispersed therein using an ultrasonic dispersing apparatus for one minute.

(10) The amounts of elution of elements other than iron contained in the iron composite particles including cadmium, lead, chromium, arsenic, whole mercury, selenium, whole cyanogen, fluorine and boron, were measured according to "Environmental Standard for Contamination of Soil", Notification No. 46 of the Environmental Agency of Japan, 1991.

(11) The measurements of the organohalogen compounds were conducted by the following methods: <Preparation of calibration curve: quantitative determination of organohalogen compounds>

The concentration of the organohalogen compounds was calculated from the calibration curve previously prepared according to the following procedure.

Trichloroethylene (TCE: $C_2HCl_3$): molecular weight: 131.39; guaranteed reagent (99.5%); density (at 20° C.): 1.461 to 1.469 g/mL Trichloroethylene was used in three standard amounts (0.05 μL, 0.1 μL and 1.0 μL) in this procedure. 30 mL of ion-exchanged water was added to a 50-mL brown vial bottle (effective capacity: 68 mL). Next, after the respective standard amounts of trichloroethylene were poured into each vial bottle, the vial bottle was immediately closed with a rubber plug with a fluororesin liner, and then an aluminum seal was firmly tightened on the rubber plug. After allowing the vial bottle to stand at 20° C. for 20 min, 50 μL of a headspace gas in the vial bottle was sampled using a syringe, and the amount of trichloroethylene contained in the sampled gas was measured by "GC-MS-QP5050" manufactured by Shimadzu Seisakusho Co., Ltd. Assuming that trichloroethylene was not decomposed at all, the relationship between the amount of trichloroethylene added and the peak area was determined from the measured values. The above analysis was carried out using a capillary column ("DB-1" manufactured by J & B Scientific Co. Ltd.; liquid phase: dimethyl polysiloxane) and He gas (flow rate: 143 L/min) as a carrier gas. Specifically, the sample was held at 40° C. for 2 min and then heated to 250° C. at a temperature rise rate of 10° C./min for analyzing the gas.

<Preparation of Samples for Measurement of Organohalogen Compounds (A)>

A 50-mL brown vial bottle (effective capacity: 68 mL) was filled with 0.1 g of the purifying iron composite particles and 30 mL of ion-exchanged water. Next, after 1 μL of trichloroethylene was poured into the vial bottle, the vial bottle was immediately closed with a rubber plug with a fluororesin liner, and an aluminum seal was firmly tightened on the rubber plug.

<Evaluation Method for Decomposition Reaction of Organohalogen Compounds (Measurement of Apparent Reaction Rate Constant>

The above vial bottle was allowed to stand at 24° C. After further allowing the vial bottle to stand at 20° C. for 20 min, 50 μL of a headspace gas in the vial bottle was sampled using a syringe. Meanwhile, the headspace gas was sampled up to maximum 500 hours at predetermined time intervals by batch method, and was analyzed by "GC-MS-QP5050" manufactured by Shimadzu Seisakusho Co., Ltd., to measure the concentration of residual trichloroethylene contained in the gas.

The reaction rate constant kobs was calculated from the measured concentration of residual trichloroethylene according to the following formula:

$$ln(C/C_0)=-k \cdot t$$

wherein $C_0$ is an initial concentration of trichloroethylene; C is a residual concentration of trichloroethylene; k is an apparent reaction rate constant ($h^{-1}$); and t is a time (h).

(12) The measurements of the heavy metals or the like were conducted by the following methods.

<Preparation of Samples for Measurement of Heavy Metals or the Like and Evaluation Method for Insolubilization Reaction (Measurement of Apparent Reaction Rate Constant)>

25 mL of a 1000 ppm standard solution (produced by Kanto Kagaku Co., Ltd.) was sampled in a 1000 mL measuring flask such that concentrations of arsenic, chromium and lead in the solution were 25 ppm, and then ion-exchanged water was added to the flask to prepare total 1000 mL of a heavy metal-containing solution. A 50-mL brown vial bottle (effective capacity: 68 mL) was filled with 0.06 g of the purifying iron composite particles and 30 mL of the above-prepared heavy metal-containing solution, and then immediately closed with a rubber plug and allowed to stand at 24° C. The contents in the vial bottle were subjected to suction filtration using a 0.45 μm membrane filter in order to separate the solution from the iron composite particles, thereby preparing a sample solution for measuring amounts of residual heavy metals. Meanwhile, the solution was sampled at predetermined time intervals up to maximum 336 hours, and the residual concentrations of the heavy metals in the solution were measured by batch method.

<Evaluation Method for Heavy Metals>

The obtained solution was analyzed using an inductively coupled high-frequency plasma atomic emission spectroscope "SPS-4000" manufactured by Seiko Denshi Kogyo Co., Ltd., to measure the residual concentration of the respective heavy metals in the solution.

Meanwhile, the measurement was performed by a calibration curve method. Specifically, a calibration curve was prepared with respect to 4 or more concentration standards, and the measurement was conducted by the calibration curve in which a correlation coefficient thereof was 0.9999 or higher.

Assuming that the relation between insolubilizing time and logarithm of (residual heavy metal concentration)/(initial heavy metal concentration) is approximated to a linear expression, the apparent reaction rate constant kobs was calculated from the measured values according to the following formula:

$$ln(C/C_0)=-k \cdot t$$

wherein $C_0$ is an initial concentration of heavy metals; C is a residual concentration of heavy metals; k is an apparent reaction rate constant ($h^{-1}$); and t is a time (h).

<Heavy Metal Elution Test Using Acid or Alkali After Insolubilization>

According to "Report of Sectional Meeting for Studies on Stability of Soil Treated for Insolubilization of Heavy Metals, etc.; Acid-Added Elution Testing Method; Alkali-Added Elution Testing Method" proposed by Soil Environment Center, the acid-added and alkali-added elution tests were conducted.

(Abstract of the Above Proposal)

In the case where the insolubilization-treated soil is evaluated for its stability upon exposure to acidic or alkaline water, it is recommended to conduct, in addition to the elution test prescribed by Notification No. 46 of the Environmental Agency of Japan, the sulfuric acid-added elution test I and the calcium hydroxide-added elution test I.

If no elution of heavy metals or the like is detected through these elution tests, the insolubilization technique is considered to be a practical and stable insolubilization treatment, and it is also considered that in the case where the insolubilized soil is returned to original place, any elution of heavy metals or the like is subsequently no longer caused even when exposed to acid or alkali to some extent.

<Preparation of Samples Used in Elution Test for Insolubilized Geavy Metals>

(1) Arsenic

A 50-mL brown vial bottle (effective capacity: 68 mL) was filled with the above purifying agent containing 8 g/L of the iron composite particles, and a 20 mg/L arsenic solution (produced by Kanto Kagaku Co., Ltd.). Then, after ion-exchanged water was added to the vial bottle to adjust a total volume of the solution in the vial bottle to 30 mL, the vial bottle was immediately closed with a rubber plug with a fluororesin liner, and then an aluminum seal was firmly tightened on the rubber plug. After allowing the vial bottle to stand at 24° C., the contents thereof were subjected to solid-liquid separation using a 0.45 μm membrane filter by a batch method. The resultant filtrate was analyzed using an inductively coupled high-frequency plasma atomic emission spectroscope "SPS-4000" manufactured by Seiko Denshi Kogyo Co., Ltd., and a pH value thereof was measured. The solid obtained after the solid-liquid separation was subjected to the acid/alkali-added elution tests proposed by Soil Environment Center after the elapse of 21 days solely.

(2) Chromium (VI)

The same procedure for arsenic as described above was conducted except that the purifying agent containing 12 g/L of the iron composite particles was used, and a 50 mg/L chromium (VI) solution (produced by Kanto Kagaku Co., Ltd.) was added.

(3) Lead

The same procedure as described above was conducted except that the purifying agent containing 1 g/L of the iron composite particles was used, and a 20 mg/L lead solution (produced by Kanto Kagaku Co., Ltd.) was added.

<Preparation of Samples for Measurements of Aliphatic Organohalogen Compounds (B)>

A 50-mL brown vial bottle (effective capacity: 68 mL) was filled with 1 g of the purifying iron composite particles and 30 mL of ion-exchanged water. Next, after 1 µL of trichloroethylene was poured into the vial bottle, the vial bottle was immediately closed with a rubber plug with a fluororesin liner, and then an aluminum seal was firmly tightened on the rubber plug. The contents in the vial bottle were shaken for 3 hours using a paint conditioner (manufactured by Red Devil Co., Ltd.).

<Evaluation Method for Aliphatic Organohalogen Compounds>

Then, 50 µL of a headspace gas in the vial bottle was sampled using a syringe, and the residual amount of trichloroethylene contained in the sampled gas was measured by "GC-MS-QP5050" manufactured by Shimadzu Seisakusho Co., Ltd.

Penetrability Test:

About a half volume of a glass column having a diameter of 3 cm and a length of 50 cm was previously filled with ion-exchanged water. Then, quartz sand having a particle size distribution thereof shown in FIG. 7, was little by little dropped into the glass column and fully filled therein while shaking the column, thereby forming a saturated soil layer. Meanwhile, the saturated soil layer had initial characteristic values including a porosity of 41.3% and a coefficient of water permeability of $2.43 \times 10^{-2}$ cm/S.

The dilute purifying agent was prepared by adding ion-exchanged water into a mixture of 12.8 mL of the purifying agent containing 4 g of the iron composite particles and an aqueous solution containing 0.67 g of sodium polyacrylate such that a total amount of water contained in the aqueous sodium polyacrylate solution and the purifying agent, and the ion-exchanged water added was 500 mL.

Next, 500 mL of the above diluted purifying agent was poured into an upper portion of the saturated soil layer filled in the glass column while maintaining a dropping height of 2 cm above the surface of the saturated soil layer so as to keep the filling pressure constant, thereby conducting a penetrability test by gravity filling method. The glass column was visually observed to examine the degree of penetration of the purifying agent into the soil after completion of pouring a whole amount of the purifying agent.

<Preparation of Samples for Decomposition Test of Organohalogen Compounds (Object to be Tested: Water) (C)>

A 50-mL brown vial bottle (effective capacity: 68 mL) was filled with the purifying agent as well as ion-exchanged water such that the amount of the iron composite particles contained in the purifying agent was 0.06 g and a total amount of water contained in the purifying agent and ion-exchanged water was 30 mL. Next, after 1.0 µL of trichloroethylene was poured into the vial bottle, the vial bottle was immediately closed with a rubber plug with a fluororesin liner, and then an aluminum seal was firmly tightened on the rubber plug.

In addition, a separate 50 mL brown vial bottle (effective capacity: 68 mL) was filled with the purifying agent as well as a solution containing 0.01 g of sodium polyacrylate such that the amount of the iron composite particles contained in the purifying agent was 0.06 g and a total amount of water contained in the purifying agent and water contained in the sodium polyacrylate solution was 30 mL. Next, after 1.0 µL of trichloroethylene was poured into the vial bottle, the vial bottle was immediately closed with a rubber plug with a fluororesin liner, and then an aluminum seal was firmly tightened on the rubber plug.

The respective vial bottles were tested by the same method as described in the above "Evaluation method for decomposition reaction of organohalogen compounds (measurement of apparent reaction rate constant" to measure the concentration of residual trichloroethylene and calculate the reaction rate constant Kobs from the measured value.

<Preparation of Samples for Decomposition Test of Organohalogen Compounds (Object to be Tested: Soil) (D)>

1.0 µL of trichloroethylene was previously added to 20 g of wet sandy soil (under 2 mm mesh sieve) to prepare a soil contaminated with trichloroethylene. A 50-mL brown vial bottle (effective capacity: 68 mL) was filled with the purifying agent as well as ion-exchanged water such that the amount of the iron composite particles contained in the purifying agent was 0.06 g and a total amount of water contained in the purifying agent and ion-exchanged water was 30 mL. Next, after the above-prepared contaminated soil was filled into the vial bottle, the vial bottle was immediately closed with a rubber plug with a fluororesin liner, and then an aluminum seal was firmly tightened on the rubber plug.

In addition, 1.0 µL of trichloroethylene was previously added to 20 g of wet sandy soil (under 2 mm mesh sieve) to prepare a soil contaminated with trichloroethylene. A separate 50-mL brown vial bottle (effective capacity: 68 mL) was filled with the purifying agent as well as a solution containing 0.01 g of sodium polyacrylate such that the amount of the iron composite particles contained in the purifying agent was 0.06 g and a total amount of water contained in the purifying agent and water contained in the sodium polyacrylate solution was 30 mL. Next, after the above-prepared contaminated soil was filled into the vial bottle, the vial bottle was immediately closed with a rubber plug with a fluororesin liner, and then an aluminum seal was firmly tightened on the rubber plug.

The respective vial bottles were tested by the same method as described in the above "Evaluation method for decomposition reaction of organohalogen compounds (measurement of apparent reaction rate constant" to measure the concentration of residual trichloroethylene and calculate the reaction rate constant Kobs from the measured value.

Example 1

<Production of Purifying Iron Composite Particles and Purifying Agent>

A reaction vessel maintained under a non-oxidative atmosphere by flowing $N_2$ gas at a rate of 3.4 cm/s, was charged with 704 L of a 1.16 mol/L $Na_2CO_3$ aqueous solution, and then with 296 L of an aqueous ferrous sulfate solution containing 1.35 mol/L of $Fe^{2+}$ (amount of $Na_2CO_3$: 2.0 equivalents per equivalent of Fe), and the contents in the reaction vessel were reacted with each other at 47° C. to produce $FeCO_3$.

The aqueous solution containing the thus obtained $FeCO_3$ was successively held at 47° C. for 70 min while blowing $N_2$ gas thereinto at a rate of 3.4 cm/s. Thereafter, air was passed through the $FeCO_3$-containing aqueous solution at 47° C. and a flow rate of 2.8 cm/s for 5.0 hours, thereby producing goethite particles. Meanwhile, it was confirmed that the pH value of the aqueous solution during the air passage was maintained at 8.5 to 9.5.

The water suspension containing the thus obtained goethite particles was mixed with 20 L of an aqueous Al sulfate solution containing 0.3 mol/L of $Al^{3+}$, and the resultant mixture was sufficiently stirred and then washed with water using a filter press, thereby obtaining a press cake. The obtained press cake was extrusion-molded and granulated using a compression-molding machine equipped with a mold plate having an orifice diameter of 4 mm, and then dried at 120° C., thereby obtaining a granulated product of the goethite particles.

It was confirmed that the goethite particles constituting the obtained granulated product were spindle-shaped particles having an average major axis diameter of 0.30 µm, an aspect ratio (major axis diameter/minor axis diameter) of 12.5:1, a BET specific surface area of 85 $m^2$/g, an Al content of 0.40% by weight and an S content of 400 ppm.

The granulated product of the goethite particles were heated at 330° C. to form hematite particles, and then dry-pulverized. Thereafter, the obtained hematite particles were deaggregated in water, and mixed with 70% sulfuric acid in an amount of 10 mL/kg under stirring. Then, the resultant mixture was dehydrated to obtain a press cake. The obtained press cake was extrusion-molded and granulated using a compression-molding machine equipped with a mold plate having an orifice diameter of 3 mm, and then dried at 120° C., thereby obtaining a granulated product of the hematite particles.

It was confirmed that the hematite particles constituting the obtained granulated product were spindle-shaped particles having an average major axis diameter of 0.24 µm, an aspect ratio (major axis diameter/minor axis diameter) of 10.7:1, and an S content of 3300 ppm.

100 g of the granulated product of the goethite particles were introduced into a fixed bed type reducing apparatus, and reduced at 450° C. for 180 min while passing $H_2$ gas therethrough until the goethite particles were completely transformed into α-Fe. Then, after replacing the $H_2$ gas with $N_2$ gas and cooling the obtained iron particles to room temperature, 300 ml of ion-exchanged water was directly introduced into the reducing furnace, and the contents of the reducing furnace were directly taken out therefrom in the form of a water suspension containing the iron particles in an amount of about 20% by weight.

The water suspension was transferred into a stainless steel beaker equipped with a baffle, and stirred at a rotating speed of 3600 rpm for 30 min using a medium-speed rotation type stirrer "0.2 kW-powered T. K. Homodisper 2.5 Model" with 40 mmφ edged turbine blades (manufactured by Tokushu Kika Kogyo Co., Ltd.) which was inserted into the beaker.

Then, the water suspension was dispersed at a rotating speed of 4000 rpm using a continuous shear type dispersing apparatus "0.55 kW-powered T. K. Homomic Line Mill PL-SL Model" manufactured by Tokushu Kika Kogyo Co., Ltd.

Thereafter, the water suspension was dispersed at a rotating speed of 500 rpm using a media type dispersing apparatus "1.5 kW-powered four-cylinder sand grinder 4-TSG-(1/8G) Model" manufactured by Tokushu Kika Kogyo Co., Ltd. which was filled with 0.25 L of 2 mmφ glass beads, thereby obtaining a purifying agent.

It was confirmed that the thus obtained purifying agent had a specific gravity of 1.25, a solid content of 30% by weight, a particle size distribution (of water suspension) with a single peak as measured by laser diffraction scattering method, a median diameter ($D_{50}$) of 1.90 µm, a ratio ($D_{90}/D_{10}$) of 1.81 and a distribution width ($D_{84}-D_{16}$) of 1.10 µm.

As a result of observing by a scanning electron microscope (×30,000), it was confirmed that the primary particles of the iron composite particles contained in the thus obtained purifying agent are rice grain-like particles having an average major axis diameter of 0.09 µm and an aspect ratio of 1.4:1.

Next, the water suspension was filtered to separate the iron composite particles therefrom, and the iron composite particles were dried in air at 40° C. for 3 hours, thereby producing purifying iron composite particles.

As a result, it was confirmed that the thus obtained iron composite particles contained α-Fe as a main component, and had a saturation magnetization value of 135 $Am^2$/kg (135 emu/g), a BET specific surface area of 27 $m^2$/g, a crystallite size of 295 Å, an Fe content of 83.0% by weight and an S content of 4000 ppm. Also, as a result of the X-ray diffraction analysis of the iron composite particles, it was confirmed that both of α-Fe and $Fe_3O_4$ were present therein, and the ratio of a diffraction intensity $D_{110}$ (α-Fe) to a sum of a diffraction intensity $D_{311}$ ($Fe_3O_4$) and the diffraction intensity $D_{110}$ ($D_{110}/(D_{311}+D_{100})$) thereof was 0.84.

<Results of Elution Test of the Purifying Iron Composite Particles>

From the results of elution test of the thus obtained iron composite particles according to the above evaluation method, it was confirmed that the iron composite particles exhibited a cadmium elution of less than 0.001 mg/L, no detected elution of whole cyanogen, a lead elution of less than 0.001 mg/L, a chromium elution of less than 0.01 mg/L, an arsenic elution of less than 0.001 mg/L, a whole mercury elution of less than 0.0005 mg/L, a selenium elution of less than 0.001 mg/L, a fluorine elution of less than 0.5 mg/L, and a boron elution of less than 1 mg/L. Therefore, it was confirmed that all amounts of these elements eluted were below the detection limit of the measuring device used, and lower than the standard values prescribed in the above Environmental Standard.

Also, the results of the test conducted for measuring contents of the respective elements in the thus obtained iron composite particles are shown in Table 6. As shown in Table 6, it was confirmed that the iron composite particles exhibited a cadmium and cadmium compound content of less than 2 mg/kg; a cyanogen compound content of less than 5 mg/kg; a lead and lead compound content of less than 5 mg/kg; a chromium (VI) compound content of less than 5 mg/kg; a arsenic and arsenic compound content of less than 1 mg/kg; a mercury and mercury compound content of less than 1 mg/kg; a selenium and selenium compound content of less than 1 mg/kg; a fluorine and fluorine compound content of less than 20 mg/kg; and a boron and boron compound content of less than 20 mg/kg. Therefore, it was confirmed that all contents of these elements were below the detection limit of the measuring device used, and lower than the standard values prescribed in the above Environmental Standard.

<Results of Purification Treatment for Organohalogen Compounds (Apparent Reaction Rate Constant)>

According to the above evaluation method, it was confirmed that when the purifying agent was used in the purification treatment of trichloroethylene, the apparent reaction rate constant was 0.034 h$^{-1}$.

Examples 14 to 17

<Results of Evaluation of Insolubilization Reaction of Heavy Metals (Apparent Reaction Rate Constant)>

According to the above evaluation method, it was confirmed that when the purifying agent was used in the purification treatment of heavy metals, the apparent reaction rate constant for arsenic was 0.0195 h$^{-1}$, the apparent reaction rate constant for chromium was 0.0138 h$^{-1}$, and the apparent reaction rate constant for lead was 0.0630 h$^{-1}$.

At this time, the solution used for measuring the residual amounts of heavy metals was maintained at a pH value of about 10 when adding any of arsenic, chromium and lead thereto, and the iron composite particles separated therefrom still exhibited a black color without any change. Therefore, it was suggested that the a ferrite compound combined with the heavy metals was formed.

On the contrary, in the case of the reduced iron and electrolytic iron used in the below-mentioned Comparative Examples, the solution used for measuring the residual amounts of heavy metals had a pH value of about 4 when adding chromium thereto, and a pH value of about 6 when adding lead thereto, and the iron particles separated from the solution after adding lead thereto formed a red precipitate. Therefore, it was suggested that an iron hydroxide compound combined with lead was formed.

<Results of Re-Elution Test for Insolubilized Heavy Metals>

The results of the elution test for insolubilized heavy metals are shown in Table 7. As shown in Table 7, from the results of the alkali elution test I, it was confirmed that the amounts of arsenic, chromium and lead eluted were below the Environmental Standard, and from the results of the acid elution test I, it was confirmed that the amounts of arsenic and chromium eluted were below the Environmental Standard. If no elution of heavy metals or the like is detected through these elution tests, it is considered that the insolubilization technique is very effective and provides a practical and stable treatment, and it is also considered that in the case where the insolubilized soil is returned to original place, any elution of heavy metals or the like is subsequently no longer caused even when exposed to acid or alkali to some extent.

Meanwhile, in the acid elution test I, only elution of lead was recognized. The reason therefor was considered by the present inventors as follow, though not clearly determined. That is, the iron composite particles were added in an amount of 8 g/L and 12 g/L in the arsenic and chromium insolubilization tests, respectively. Whereas, in the lead insolubilization test, the iron composite particles were added in an amount as small as 1 g/L. The reason why the purification treatment of contaminated water was completed notwithstanding the use of such a small amount of the iron composite particles, was considered to be that a part of lead was absorbed into the iron composite particles in the form of a hydroxide after the insolubilization. However, in the consideration of re-elution form the particles after the insolubilization, it was suggested that the use of such a small amount of the iron composite particles was inappropriate.

<Goethite Particles>

As goethite particles, there were prepared goethite particles shown in Table 1.

Goethite Particles 1, 2 and 5:

The same procedure as defined in Example 1 was conducted except that the amount of the aqueous Al sulfate solution added was variously changed, thereby obtaining a granulated product of the goethite particles.

Goethite Particles 3:

12.8 L of an aqueous ferrous sulfate solution containing Fe$^{2+}$ in an amount of 1.50 mol/L was mixed with 30.2 L of a 0.44-N NaOH aqueous solution (corresponding to 0.35 equivalent based on Fe$^{2+}$ contained in the aqueous ferrous sulfate solution), and the obtained mixed solution was reacted at a pH of 6.7 and a temperature of 38° C., thereby producing an aqueous ferrous sulfate solution containing Fe(OH)$_2$. Then, air was passed through the aqueous ferrous sulfate solution containing Fe(OH)$_2$, at a temperature of 40° C. and a flow rate of 130 L/min for 3.0 hours, thereby producing goethite core particles.

The aqueous ferrous sulfate solution containing the goethite core particles (in an amount corresponding to 35 mol % based on finally produced goethite particles) was mixed with 7.0 L of a 5.4N Na$_2$CO$_3$ aqueous solution (corresponding to 1.5 equivalents based on residual Fe$^{2+}$ contained in the aqueous ferrous sulfate solution). Then, air was passed through the mixed solution at a pH of 9.4, a temperature of 42° C. and a flow rate of 130 L/min for 4 hours, thereby producing goethite particles. The suspension containing the thus obtained goethite particles was mixed with 0.96 L of an aqueous Al sulfate solution containing Al$^{3+}$ in an amount of 0.3 mol/L, fully stirred and then washed with water using a filter press, thereby obtaining a press cake. The obtained press cake was extrusion-molded and granulated using a compression-molding machine equipped with a mold plate having an orifice diameter of 4 mm, and then dried at 120° C., thereby obtaining a granulated product of the goethite particles.

It was confirmed that the goethite particles constituting the above granulated product were acicular particles having an average major axis diameter of 0.33 μm, an aspect ratio (major axis diameter/minor axis diameter) of 25.0:1, a BET specific surface area of 70 m$^2$/g, an Al content of 0.42% by weight and an S content of 4000 ppm.

Goethite Particles 4:

The same procedure as defined above for production of the goethite particles 3 was conducted except that the amount of the aqueous Al sulfate solution added was changed, thereby obtaining a granulated product of the goethite particles.

Examples 2 to 7 and Comparative Examples 1 to 7

<Purifying Iron Composite Particles and Purifying Agent>

The same procedure as defined in Example 1 was conducted except that kind of goethite particles, heat-dehydrating temperature, addition or non-addition of sulfuric acid to the suspension containing hematite particles as well as amount of the sulfuric acid, if added, and heat-reducing temperature were changed variously, thereby obtaining purifying iron composite particles and a purifying agent.

Essential production conditions are shown in Table 2, and various properties of the obtained purifying iron composite particles and purifying agent are shown in Table 3.

Meanwhile, in Comparative Example 2, there were used α-Fe-free magnetite particles obtained by introducing 100 g of a granulated product of the above goethite particles 1 into a rotary reducing apparatus, and reducing the granulated product at 300° C. for 180 min while passing $H_2$ gas therethrough until being completely reduced into $Fe_3O_4$. Further, in Comparative Examples 3 and 4, there were used reduced iron particles and electrolytic iron particles, respectively. Further, in Comparative Examples 5 and 6, there were used carbonyl iron particles, and in Comparative Example 7, there were used sponge iron particles.

Examples 8 to 13 and Comparative Examples 8 to 14

<Measurement of Apparent Reaction Rate Constant>

The kind of purifying iron composite particles and kind of purifying agent were changed variously to measure apparent reaction rate constants thereof. Essential treatment conditions and the measurement results are shown in Table 4.

Meanwhile, in Comparative Examples 12 to 14, since substantially no trichloroethylene was decomposed, the apparent reaction rate constants were unmeasurable.

Comparative Examples 15 to 18

<Measurement of Apparent Reaction Rate Constant Upon Insolubilization of Heavy Metals>

The kind of purifying iron composite particles and kind of purifying agent, kind of heavy metals to be insolubilized, and concentrations of the heavy metals added were changed variously to measure apparent reaction rate constants thereof. Essential treatment conditions and the measurement results are shown in Table 5.

Examples 17 to 20

Various properties of the purifying iron composite particles and the purifying agent after preservation are shown in Table 8. Meanwhile, in Examples 17 to 20, the purifying agent obtained in Example 2 which had a solid content of 30% was preserved in an open system for a period of 1, 3, 6 and 12 months, respectively.

Examples 21 to 25 and Comparative Examples 19 and 20

<Results of Purification Treatment of Aliphatic Organohalogen Compounds>

The purification treatment was conducted while variously changing kind of purifying iron composite particles according to the above "preparation of samples for measurement of aliphatic organohalogen compounds" and "evaluation method for aliphatic organohalogen compounds". The measurement results are shown in Table 9.

Examples 26 to 65

Sodium polyacrylate, sodium hydrogen carbonate and sodium sulfate were added to the purifying agent obtained in Examples 3, 5, 6 and 19 while variously changing the kind and amount of the sodium polyacrylate, and addition or non-addition of the sodium hydrogen carbonate and sodium sulfate, and the amount of the sodium hydrogen carbonate and sodium sulfate, if added, thereby obtaining purifying agents. The apparent reaction rate constants of the thus obtained purifying agents were measured by the same method as defined in Example 1, and the apparent reaction rate constants upon insolubilization of heavy metals were measured by the same method as defined in Example 1. The measurement results are shown in Table 12.

In addition, a travel distance in column as well as penetration time (500 mL) were measured. The measurement results are shown in Table 10.

Examples 26 to 46 and Comparative Examples 21 to 26

The purifying agent obtained in Examples 3, 5, 6 and 19, and Comparative Examples 2 to 7 was further diluted or mixed with sodium polyacrylate, sodium hydrogen carbonate or sodium sulfate while variously changing the degree of dilution, kind and amount of sodium polyacrylate added, and addition or non-addition of sodium hydrogen carbonate or sodium sulfate as well as the amount thereof, if added, as shown in Table 10, thereby obtaining purifying agents.

The additives used were as follows:

Sodium acrylate: "GOOD-RITE K-739" produced by NOVEON CO., LTD.; "JURYMER AC-10NP" produced by NIHON JUNYAKU CO., LTD.; "JURYMER AC-103" produced by NIHON JUNYAKU CO., LTD.; "AQUALIC DL-100" produced by NIPPON SHOKUBAI CO., LTD.

Inorganic salts: sodium hydrogen carbonate produced by KANTO KAGAKU CO., LTD.; sodium sulfate produced by KANTO KAGAKU CO., LTD.

<Results of Penetrability Test>

The thus obtained purifying agents were subjected to penetrability test using a sand column. The penetrability of the respective purifying agents was evaluated as follows. That is, after completion of the penetration, the sand column was observed to measure a penetration distance of the purifying agent from the upper surface of the column, in which the soil was colored black as a color of the purifying agent. The ratio of the thus measured penetration distance to a penetration distance of the diluted purifying agent containing no additives (Example 46) was calculated and determined as a penetrability (penetration percentage) of the purifying agent.

In Comparative Examples 21 to 31, the iron particles were immediately precipitated due to coarse particles, and stayed at the upper portion of the sand filled in the column, so that substantially no penetration of the iron particles into the soil was recognized.

The evaluation results are shown in Table 10.

Meanwhile, when a mixture of the purifying agent and sand was swept off from the column after visual observation upon completion of the penetration, it was confirmed that the black-colored purifying agent was uniformly dispersed in the sand and, therefore, no banding or segregation thereof was recognized.

Examples 47 to 65 and Comparative Examples 27 to 28

<Results of Purification Treatment of Organohalogen Compounds (Apparent Reaction Rate Constant)>

An apparent reaction rate constant of the purifying agent was measured while variously changing the kind of the purifying agent according to the procedures described in "Preparation of samples for decomposition test of organohalogen compounds (object to be tested: water) (C)" and "Preparation of samples for decomposition test of organohalogen compounds (object to be tested: soil) (D)".

Essential treatment conditions and measurement results are shown in Tables 12 and 13.

Meanwhile, in Comparative Examples 30 to 32, since substantially no decomposition of trichloroethylene was caused, the apparent reaction rate constant was unmeasurable.

TABLE 1

| Examples and Comparative Examples | Properties of goethite particles | | |
|---|---|---|---|
| | Shape | Average major axis diameter (μm) | Aspect ratio (—) |
| Goethite particles 1 | Spindle-shaped | 0.30 | 12.5:1 |
| Goethite particles 2 | Spindle-shaped | 0.30 | 12.5:1 |
| Goethite particles 3 | Acicular | 0.33 | 25.0:1 |
| Goethite particles 4 | Acicular | 0.33 | 25.0:1 |
| Goethite particles 5 | Spindle-shaped | 0.30 | 12.5:1 |
| Example 1 | Spindle-shaped | 0.30 | 12.5:1 |

| Examples and Comparative Examples | Properties of goethite particles | | |
|---|---|---|---|
| | BET specific surface area ($m^2/g$) | Al content (wt %) | S content (ppm) |
| Goethite particles 1 | 85 | 0.13 | 400 |
| Goethite particles 2 | 85 | 0.75 | 400 |
| Goethite particles 3 | 70 | 0.42 | 4000 |
| Goethite particles 4 | 70 | 0.70 | 4000 |
| Goethite particles 5 | 85 | 1.50 | 400 |
| Example 1 | 85 | 0.40 | 400 |

TABLE 2

| Examples and Comparative Examples | Kind of goethite particles used | Heat-dehydrating temperature (° C.) | Average particle diameter of hematite particles (μm) |
|---|---|---|---|
| Example 1 | — | 330 | 0.24 |
| Example 2 | Goethite particles 1 | 300 | 0.24 |
| Example 3 | Goethite particles 1 | 300 | 0.24 |
| Example 4 | Goethite particles 2 | 350 | 0.23 |
| Example 5 | Goethite particles 3 | 330 | 0.25 |
| Example 6 | Goethite particles 3 | 260 | 0.24 |
| Example 7 | Goethite particles 4 | 350 | 0.21 |
| Comparative Example 1 | Goethite particles 5 | 300 | 0.21 |
| Comparative Example 2 | Goethite particles 1 | 300 | 0.24 |

| Examples and Comparative Examples | Amount of sulfuric acid added (mL/kg) | S content (ppm) | Reducing temperature (° C.) | Condition |
|---|---|---|---|---|
| Example 1 | 10 | 3300 | 450 | Iron composite particles & purifying agent |
| Example 2 | 10 | 3300 | 400 | Iron composite particles |
| Example 3 | 10 | 3300 | 450 | Purifying agent |
| Example 4 | 15 | 4200 | 500 | Purifying agent |
| Example 5 | — | 4500 | 400 | Iron composite particles |
| Example 6 | — | 4500 | 360 | Purifying agent |
| Example 7 | — | 4500 | 500 | Purifying agent |
| Comparative Example 1 | 10 | 3300 | 400 | Purifying agent |
| Comparative Example 2 | 10 | 3300 | 300 | Purifying agent |

TABLE 3

| Examples and Comparative Examples | Properties of purifying iron composite particles | | | | |
|---|---|---|---|---|---|
| | Average particle diameter (μm) | BET specific surface ($m^2/g$) | Fe content (wt %) | Al content (wt %) | S content (ppm) |
| Example 1 | 0.09 | 27 | 83.0 | 0.67 | 4000 |
| Example 2 | 0.07 | 30 | 86.1 | 0.22 | 4000 |
| Example 3 | 0.09 | 25 | 87.2 | 0.22 | 4000 |
| Example 4 | 0.13 | 11 | 88.1 | 1.19 | 5100 |
| Example 5 | 0.11 | 20 | 85.9 | 0.68 | 5500 |
| Example 6 | 0.09 | 33 | 76.0 | 0.68 | 5500 |
| Example 7 | 0.16 | 14 | 88.8 | 1.01 | 5500 |
| Comparative Example 1 | 0.05 | 46 | 71.1 | 2.40 | 4000 |
| Comparative Example 2 | 0.24 | 52 | 66.9 | 0.05 | 4000 |
| Comparative Example 3 | 100 | 0.05 | 98.2 | 0.00 | 30 |
| Comparative Example 4 | 50 | 0.03 | 98.3 | 0.00 | 50 |
| Comparative Example 5 | 7.5 | 0.1 | 98.8 | 0.00 | 2 |
| Comparative Example 6 | 1.65 | 0.7 | 99.1 | 0.00 | 2 |
| Comparative Example 7 | 180 | 0.2 | 99.0 | 0.00 | 3 |

| Examples and Comparative Examples | Properties of purifying iron composite particles | | |
|---|---|---|---|
| | Crystallite size $D_{110}$ (Å) | Saturation magnetization value (σs) | |
| | | ($Am^2/kg$) | (emu/g) |
| Example 1 | 295 | 135 | 135 |
| Example 2 | 284 | 142 | 142 |
| Example 3 | 292 | 144 | 144 |
| Example 4 | 306 | 146 | 146 |
| Example 5 | 298 | 141 | 141 |
| Example 6 | 200 | 93 | 93 |
| Example 7 | 299 | 149 | 149 |
| Comparative Example 1 | 190 | 81 | 81 |
| Comparative Example 2 | — | 76 | 76 |
| Comparative Example 3 | 440 | 204 | 204 |
| Comparative Example 4 | 430 | 208 | 208 |
| Comparative Example 5 | 256 | 208 | 208 |

TABLE 3-continued

| | | | |
|---|---|---|---|
| Comparative Example 6 | 93 | 203 | 203 |
| Comparative Example 7 | 221 | 197 | 197 |

Properties of purifying iron composite particles

| Examples and Comparative Examples | Crystal phase | X-ray diffraction intensity ratio $D_{110}/(D_{110} + D_{311})$ (—) | Condition |
|---|---|---|---|
| Example 1 | α-Fe and $Fe_3O_4$ mixed phase | 0.84 | Iron composite particles & purifying agent |
| Example 2 | α-Fe and $Fe_3O_4$ mixed phase | 0.88 | Iron composite particles |
| Example 3 | α-Fe and $Fe_3O_4$ mixed phase | 0.90 | Purifying agent |
| Example 4 | α-Fe and $Fe_3O_4$ mixed phase | 0.92 | Purifying agent |
| Example 5 | α-Fe and $Fe_3O_4$ mixed phase | 0.88 | Iron composite particles |
| Example 6 | α-Fe and $Fe_3O_4$ mixed phase | 0.35 | Purifying agent |
| Example 7 | α-Fe and $Fe_3O_4$ mixed phase | 0.94 | Purifying agent |
| Comparative Example 1 | α-Fe and $Fe_3O_4$ mixed phase | 0.14 | Purifying agent |
| Comparative Example 2 | $Fe_3O_4$ single phase | — | Particles |
| Comparative Example 3 | α-Fe single phase | 1.00 | Particles |
| Comparative Example 4 | α-Fe single phase | 1.00 | Particles |
| Comparative Example 5 | α-Fe single phase | 1.00 | Particles |
| Comparative Example 6 | α-Fe single phase | 1.00 | Particles |
| Comparative Example 7 | α-Fe single phase | 1.00 | Particles |

TABLE 4

| Examples and Comparative Examples | Kind of iron composite particles or purifying agent used | Apparent reaction rate constant Kobs ($h^{-1}$) |
|---|---|---|
| Example 1 | — | 0.0340 |
| Example 8 | Example 2 | 0.0310 |
| Example 9 | Example 3 | 0.0330 |
| Example 10 | Example 4 | 0.0270 |
| Example 11 | Example 5 | 0.0260 |
| Example 12 | Example 6 | 0.0240 |
| Example 13 | Example 7 | 0.0350 |
| Comparative Example 8 | Comparative Example 1 | 0.0048 |
| Comparative Example 9 | Comparative Example 2 | 0.0010 |
| Comparative Example 10 | Comparative Example 3 | 0.0007 |
| Comparative Example 11 | Comparative Example 4 | 0.0009 |
| Comparative Example 12 | Comparative Example 5 | Undecomposable |
| Comparative Example 13 | Comparative Example 6 | Undecomposable |
| Comparative Example 14 | Comparative Example 7 | Undecomposable |

TABLE 5

| Examples and Comparative Examples | Kind of iron composite particles or purifying agent used | Kind of heavy metals added | Apparent reaction rate constant Kobs ($h^{-1}$) |
|---|---|---|---|
| Example 14 | Example 1 | As | 0.0195 |
| Example 15 | Example 1 | Cr | 0.0138 |
| Example 16 | Example 1 | Pb | 0.0630 |
| Comparative Example 15 | Comparative Example 3 | Cr | 0.0003 |
| Comparative Example 16 | Comparative Example 3 | Pb | 0.0339 |
| Comparative Example 17 | Comparative Example 4 | Cr | 0.0003 |
| Comparative Example 18 | Comparative Example 4 | Pb | 0.0282 |

TABLE 6

| Iron composite particles used | Compound | Analyzed value | Environmental standard value | Testing method |
|---|---|---|---|---|
| Example 1 | Cadmium and cadmium compound | <2 mg/kg | ≦150 mg/kg | JIS K0102 55.1 |
| Example 1 | Cyanogen compound | <5 mg/kg | ≦50 mg/kg | JIS K0102 38.1 & 38.3 |
| Example 1 | Lead and lead compound | <5 mg/kg | ≦150 mg/kg | JIS K0102 54.1 |
| Example 1 | Chromium (VI) compound | <5 mg/kg | ≦250 mg/kg | JIS K0102 65.2.1 |
| Example 1 | Arsenic and arsenic compound | <1 mg/kg | ≦150 mg/kg | JIS K0102 61.2 |
| Example 1 | Mercury and mercury compound | <1 mg/kg | ≦15 mg/kg | Attached Table 1 of Sho-46 Notification No. 59 of Environmental Agency |
| Example 1 | Selenium and selenium compound | <1 mg/kg | ≦150 mg/kg | JIS K0102 67.2 |
| Example 1 | Fluorine and fluorine compound | <20 mg/kg | ≦4000 mg/kg | JIS K0102 34.1 |
| Example 1 | Boron and boron compound | <20 mg/kg | ≦4000 mg/kg | JIS K0102 47.3 |

TABLE 7

| Iron composite particles used | Compound | Analyzed value | Environmental standard value | Testing method |
|---|---|---|---|---|
| Example 1 | Arsenic | <0.001 mg/L | <0.01 mg/L | Acid-addition elution testing method I: JIS K0102 61.2 |
| Example 1 | Arsenic | <0.001 mg/L | <0.01 mg/L | Alkali-addition elution testing method I: JIS K0102 61.2 |

TABLE 7-continued

| Iron composite particles used | Compound | Analyzed value | Environmental standard value | Testing method |
|---|---|---|---|---|
| Example 1 | Whole chromium | <0.05 mg/L | $Cr^{6+}$ <0.05 mg/L | Acid-addition elution testing method I: JIS K0102 61.2 |
| Example 1 | Whole chromium | <0.05 mg/L | $Cr^{6+}$ <0.05 mg/L | Alkali-addition elution testing method I: JIS K0102 61.2 |
| Example 1 | Lead | 5.5 mg/L | <0.01 mg/L | Acid-addition elution testing method I: JIS K0102 61.2 |
| Example 1 | Lead | <0.005 mg/L | <0.01 mg/L | Alkali-addition elution testing method I: JIS K0102 61.2 |

TABLE 8

| | Properties of purifying iron composite particles | | | |
|---|---|---|---|---|
| Examples | Preservation period of purifying agent (days) | Diameter of coarse particles produced (μm) | BET specific surface ($m^2/g$) | Fe content (wt %) |
| Example 17 | 30 | 0.20 | 27 | 77.5 |
| Example 18 | 90 | 0.50 | 20 | 73.8 |
| Example 19 | 180 | 1.10 | 21 | 71.2 |
| Example 20 | 360 | 3.00 | 20 | 69.8 |

| | Properties of purifying iron composite particles | |
|---|---|---|
| | Crystallite size $D_{110}$ | Saturation magnetization value (σs) |
| Examples | (Å) | ($Am^2/kg$) / (emu/g) |
| Example 17 | 273 | 121 / 121 |
| Example 18 | 273 | 97 / 97 |
| Example 19 | 264 | 87 / 87 |
| Example 20 | 265 | 88 / 88 |

| | Properties of purifying iron composite particles | | |
|---|---|---|---|
| Examples | Crystal phase | X-ray diffraction intensity ratio $D_{110}/(D_{110} + D_{311})$ (—) | Condition |
| Example 17 | α-Fe and $Fe_3O_4$ mixed phase | 0.71 | Purifying agent |
| Example 18 | α-Fe and $Fe_3O_4$ mixed phase | 0.45 | Purifying agent |
| Example 19 | α-Fe and $Fe_3O_4$ mixed phase | 0.24 | Purifying agent |
| Example 20 | α-Fe and $Fe_3O_4$ mixed phase | 0.25 | Purifying agent |

TABLE 9

| Examples and Comparative Examples | Kind of iron composite particles used | Residual percentage of trichloroethylene (%) |
|---|---|---|
| Example 21 | Example 2 | 2.7 |
| Example 22 | Example 17 | 5.1 |
| Example 23 | Example 18 | 5.8 |
| Example 24 | Example 19 | 8.1 |
| Example 25 | Example 20 | 7.9 |
| Comparative Example 19 | Comparative Example 3 | 70.0 |
| Comparative Example 20 | Comparative Example 4 | 71.0 |

TABLE 10

| Examples | Kind of purifying agent | Solid content of iron composite particles (g/L) | Sodium polyacrylate Kind | Solid content (g/L) |
|---|---|---|---|---|
| Example 26 | Example 3 | 8.0 | K-739 | 1.3 |
| Example 27 | Example 3 | 8.0 | DL-100 | 1.3 |
| Example 28 | Example 3 | 8.0 | AC-103 | 1.3 |
| Example 29 | Example 3 | 8.0 | — | — |
| Example 30 | Example 3 | 8.0 | — | — |
| Example 31 | Example 3 | 8.0 | — | — |
| Example 32 | Example 3 | 8.0 | AC-10NP | 0.8 |
| Example 33 | Example 3 | 3.3 | AC-10NP | 0.6 |
| Example 34 | Example 3 | 8.0 | AC-10NP | 1.3 |
| Example 35 | Example 5 | 8.0 | AC-10NP | 1.3 |
| Example 36 | Example 6 | 8.0 | AC-10NP | 1.3 |
| Example 37 | Example 3 | 70 | AC-10NP | 11.7 |
| Example 38 | Example 19 | 8.0 | AC-10NP | 1.3 |
| Example 39 | Example 3 | 8.0 | AC-10NP | 8.0 |
| Example 40 | Example 3 | 8.0 | AC-10NP | 1.3 |
| Example 41 | Example 3 | 8.0 | AC-10NP | 1.3 |
| Example 42 | Example 3 | 8.0 | AC-10NP | 1.3 |
| Example 43 | Example 3 | 8.0 | AC-10NP | 1.3 |
| Example 44 | Example 3 | 8.0 | AC-10NP | 1.3 |
| Example 45 | Example 3 | 8.0 | AC-10NP | 1.3 |
| Example 46 | Example 3 | 8.0 | — | — |

| Examples | Content of $NaHCO_3$ (wt %) | Content of $Na_2SO_4$ (wt %) | Penetration percentage (%) |
|---|---|---|---|
| Example 26 | — | — | 450 |
| Example 27 | — | — | 460 |
| Example 28 | — | — | 460 |
| Example 29 | 0.06 | 0.42 | 210 |
| Example 30 | 0.15 | — | 220 |
| Example 31 | — | 0.91 | 210 |
| Example 32 | — | — | 220 |
| Example 33 | — | — | 280 |
| Example 34 | — | — | 460 |
| Example 35 | — | — | 450 |
| Example 36 | — | — | 460 |
| Example 37 | — | — | 440 |
| Example 38 | — | — | 410 |
| Example 39 | — | — | 500 |
| Example 40 | 0.02 | 0.22 | 520 |
| Example 41 | 0.06 | 0.42 | 700 |
| Example 42 | 0.06 | — | 510 |
| Example 43 | 0.15 | — | 690 |
| Example 44 | — | 0.23 | 520 |
| Example 45 | — | 0.91 | 690 |
| Example 46 | — | — | 100 |

TABLE 11

| Comparative Examples | Kind of purifying agent | Solid content of iron composite particles (g/L) | Sodium polyacrylate Kind | Sodium polyacrylate Solid content (g/L) |
|---|---|---|---|---|
| Comparative Example 21 | Comparative Example 2 | 8.0 | AC-10NP | 1.3 |
| Comparative Example 22 | Comparative Example 3 | 8.0 | AC-10NP | 1.3 |
| Comparative Example 23 | Comparative Example 4 | 8.0 | AC-10NP | 1.3 |
| Comparative Example 24 | Comparative Example 5 | 8.0 | AC-10NP | 1.3 |
| Comparative Example 25 | Comparative Example 6 | 8.0 | AC-10NP | 1.3 |
| Comparative Example 26 | Comparative Example 7 | 8.0 | AC-10NP | 1.3 |

| Examples | Content of $NaHCO_3$ (wt %) | Content of $Na_2SO_4$ (wt %) | Penetration percentage (%) |
|---|---|---|---|
| Comparative Example 21 | — | — | 20 |
| Comparative Example 22 | — | — | 10 |
| Comparative Example 23 | — | — | 10 |
| Comparative Example 24 | — | — | 10 |
| Comparative Example 25 | — | — | 10 |
| Comparative Example 26 | — | — | 10 |

TABLE 12

| Examples | Kind of purifying agent | Solid content of iron composite particles (g/L) | Sodium polyacrylate Kind | Sodium polyacrylate Solid content (g/L) |
|---|---|---|---|---|
| Example 47 | Example 3 | 2.0 | K-739 | 0.3 |
| Example 48 | Example 3 | 2.0 | DL-100 | 0.3 |
| Example 49 | Example 3 | 2.0 | AC-103 | 0.3 |
| Example 50 | Example 3 | 2.0 | — | — |
| Example 51 | Example 3 | 2.0 | — | — |
| Example 52 | Example 3 | 2.0 | — | — |
| Example 53 | Example 3 | 2.0 | AC-10NP | 0.2 |
| Example 54 | Example 3 | 2.0 | AC-10NP | 0.3 |
| Example 55 | Example 5 | 2.0 | AC-10NP | 0.3 |
| Example 56 | Example 6 | 2.0 | AC-10NP | 0.3 |
| Example 57 | Example 19 | 2.0 | AC-10NP | 0.3 |
| Example 58 | Example 3 | 2.0 | AC-10NP | 2.0 |
| Example 59 | Example 3 | 2.0 | AC-10NP | 0.3 |
| Example 60 | Example 3 | 2.0 | AC-10NP | 0.3 |
| Example 61 | Example 3 | 2.0 | AC-10NP | 0.3 |
| Example 62 | Example 3 | 2.0 | AC-10NP | 0.3 |
| Example 63 | Example 3 | 2.0 | AC-10NP | 0.3 |
| Example 64 | Example 3 | 2.0 | AC-10NP | 0.3 |
| Example 65 | Example 3 | 2.0 | — | — |

| Examples | Content of $NaHCO_3$ (wt %) | Content of $Na_2SO_4$ (wt %) | Kobs Soil (1/h) | Kobs Water (1/h) |
|---|---|---|---|---|
| Example 47 | — | — | 0.0141 | 0.0153 |
| Example 48 | — | — | 0.0148 | 0.0159 |
| Example 49 | — | — | 0.0145 | 0.0155 |
| Example 50 | 0.06 | 0.42 | 0.0161 | 0.0175 |
| Example 51 | 0.15 | — | 0.0152 | 0.0170 |
| Example 52 | — | 0.91 | 0.0166 | 0.0180 |
| Example 53 | — | — | 0.0148 | 0.0165 |
| Example 54 | — | — | 0.0142 | 0.0157 |
| Example 55 | — | — | 0.0127 | 0.0138 |
| Example 56 | — | — | 0.0145 | 0.0160 |
| Example 57 | — | — | 0.0119 | 0.0105 |
| Example 58 | — | — | 0.0129 | 0.0140 |
| Example 59 | 0.02 | 0.22 | 0.0137 | 0.0151 |
| Example 60 | 0.06 | 0.42 | 0.0138 | 0.0148 |
| Example 61 | 0.06 | — | 0.0140 | 0.0147 |
| Example 62 | 0.15 | — | 0.0132 | 0.0144 |
| Example 63 | — | 0.23 | 0.0142 | 0.0152 |
| Example 64 | — | 0.91 | 0.0138 | 0.0150 |
| Example 65 | — | — | 0.0180 | 0.0188 |

TABLE 13

| Comparative Examples | Kind of purifying agent | Solid content of iron composite particles (g/L) | Sodium polyacrylate Kind | Sodium polyacrylate Solid content (g/L) |
|---|---|---|---|---|
| Comparative Example 27 | Comparative Example 2 | 2.0 | AC-10NP | 0.3 |
| Comparative Example 28 | Comparative Example 3 | 2.0 | AC-10NP | 0.3 |
| Comparative Example 29 | Comparative Example 4 | 2.0 | AC-10NP | 0.3 |
| Comparative Example 30 | Comparative Example 5 | 2.0 | AC-10NP | 0.3 |
| Comparative Example 31 | Comparative Example 6 | 2.0 | AC-10NP | 0.3 |
| Comparative Example 32 | Comparative Example 7 | 2.0 | AC-10NP | 0.3 |

| Comparative Examples | Content of $NaHCO_3$ (wt %) | Content of $Na_2SO_4$ (wt %) | Kobs Soil (1/h) | Kobs Water (1/h) |
|---|---|---|---|---|
| Comparative Example 27 | — | — | 0.0007 | 0.0010 |
| Comparative Example 28 | — | — | 0.0006 | 0.0007 |
| Comparative Example 29 | — | — | 0.0008 | 0.0009 |
| Comparative Example 30 | — | — | Undecomposable | Undecomposable |
| Comparative Example 31 | — | — | Undecomposable | Undecomposable |
| Comparative Example 32 | — | — | Undecomposable | Undecomposable |

What is claimed is:

1. A purifying agent for soil or ground water, comprising a water suspension containing as an effective ingredient iron composite particles comprising α-Fe and megnetite, and having a ratio of a diffraction intensity $D_{110}$ of (110) plane of α-Fe to a sum of a diffraction intensity $D_{311}$ of (311) plane of magnetite and the diffraction intensity $D_{110}(D_{110}/(D_{311}+D_{110}))$ of 0.30 to 0.95 as measured from X-ray diffraction spectrum of the iron composite particles, an Al content of 0.10 to 1.50% by weight and an S content of at least 3500 ppm, a saturation magnetization value of 85 to 155 $Am^2/kg$, a BET specific surface area of 5 to 60 $m^2/g$, a crystallite size of (110) plane of α-Fe of 200 to 400 Å, an Fe content of not less than 75% by weight based on the weight of whole particles.

2. A process for producing iron composite particles for purifying soil or ground water, comprising:

heat-reducing goethite particles having an average major axis diameter of 0.05 to 0.50 μm, an Al content of 0.06 to 1.00% by weight and an S content of 2200 to 4500 ppm or hematite particles having an average major axis diameter of 0.05 to 0.50 μm, an Al content of 0.07 to 1.13% by weight and an S content of 2400 to 5000 ppm, at a temperature of 350 to 600° C. to produce iron particles;

after cooling, transferring the iron particles into water without forming a surface oxidation film on surface of the iron particles in a gas phase;

forming the surface oxidation film on the surface of the iron particles in water; and then drying the iron particles having the surface oxidation film thereon.

3. A purifying agent for soil or ground water, comprising a water suspension containing iron composite particles as an effective ingredient which comprise α-Fe and magnetite, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.20 to 0.95 as measured from X-ray diffraction spectrum of the iron composite particles, an Al content of 0.10 to 1.50% by weight, an S content of at least 3500 ppm, a saturation magnetization value of 60 to 155 Am²/kg, a crystallite size of (110) plane of α-Fe of 200 to 400 Å, an Fe content of not less than 65% by weight based on the weight of whole particles, an average particle diameter of 0.05 to 0.5 μm and a particle diameter of coarse particles of usually 0.5 to 5.0 μm.

4. A purifying agent according to claim 3, wherein said iron composite particles are diluted to a concentration of 0.5 to 100 g/L.

5. A purifying agent according to claim 4, wherein said purifying agent further comprises sodium hydrogen carbonate, sodium sulfate or a mixture thereof.

6. A purifying agent according to claim 5, wherein said sodium hydrogen carbonate is contained in an amount of 0.01 to 0.1% by weight, and said sodium sulfate is contained in an amount of 0.04 to 1.0% by weight.

7. A purifying agent according to claim 3, wherein said purifying agent further comprises sodium polyacrylate.

8. A purifying agent according to claim 7, wherein said sodium polyacrylate is contained in an amount of 5 to 50% by weight, calculated as a solid content thereof, based on the weight of the iron composite particles.

9. A purifying agent according to claim 3, wherein said iron composite particles have a saturation magnetization value of 70 to 155 Am²/kg.

10. A purifying agent according to claim 3, wherein said iron composite particles have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.30 to 0.95 as measured from X-ray diffraction spectrum of the iron composite particles, a saturation magnetization value of 85 to 155 Am²/kg, and an Fe content of not less than 75% by weight based on the weight of whole particles.

11. A purifying agent according to claim 3, wherein secondary particles of said iron composite particles have a ratio of $D_{90}$ to $D_{10}$ ($D_{90}/D_{10}$) of 1.5 to 5.0 (wherein $D_{90}$ represents a particle diameter corresponding to an accumulative volume of particles of 90% as measured and accumulated with respect to respective particle diameters and expressed by percentage based on a total volume of the iron composite particles as 100%, and $D_{10}$ represents a particle diameter corresponding to an accumulative volume of particles of 10% as measured and accumulated with respect to respective particle diameters and expressed by percentage based on a total volume of the iron composite particles as 100%), and a distribution width ($D_{84} - D_{16}$) of 0.5 to 5.0 μm (wherein $D_{84}$ represents a particle diameter corresponding to an accumulative volume of particles of 84% as measured and accumulated with respect to respective particle diameters and expressed by percentage based on a total volume of the iron particles as 100%, and $D_{16}$ represents a particle diameter corresponding to an accumulative volume of particles of 16% as measured and accumulated with respect to respective particle diameters and expressed by percentage based on a total volume of the iron composite particles as 100%).

12. A process for producing a purifying agent for soil or ground water, comprising:

preparing a water suspension containing iron composite particles produced by the steps of:

heat-reducing goethite particles having an average major axis diameter of 0.05 to 0.50 μm, an Al content of 0.06 to 1.00% by weight and an S content of 2200 to 4500 ppm, or hematite particles having an average major axis diameter of 0.05 to 0.50 μm, an Al content of 0.07 to 1.13% by weight and an S content of 2400 to 5000 ppm, at a temperature of 350 to 600° C. to produce iron particles;

after cooling, transferring the iron particles into water without forming a surface oxidation film on surface of the iron particles in a gas phase; and forming the surface oxidation film on the surface of the iron particles in water.

* * * * *